United States Patent
Liu et al.

(10) Patent No.: US 11,888,701 B1
(45) Date of Patent: Jan. 30, 2024

(54) SELF-HEALING AND RESILIENCY IN RADIO-BASED NETWORKS USING A COMMUNITY MODEL

(71) Applicant: Amazon Technologies, Inc., Seattle, WA (US)

(72) Inventors: Yuan-An Liu, Pleasanton, CA (US); Arnold Cataniag, Issaquah, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 18/066,076

(22) Filed: Dec. 14, 2022

(51) Int. Cl.
*H04L 41/122* (2022.01)
*H04L 41/0663* (2022.01)

(52) U.S. Cl.
CPC ........ *H04L 41/122* (2022.05); *H04L 41/0663* (2013.01)

(58) Field of Classification Search
CPC ... H04L 41/0663; H04L 41/122; H04L 47/24; H04L 5/0044; H04L 67/1014; G06F 16/93; G06F 30/18; G06F 9/3877; G06F 9/45558; G06F 9/547; H04W 12/088; H04W 28/24; H04W 4/40; H04W 4/50; H04W 76/10
See application file for complete search history.

(56) References Cited

U.S. PATENT DOCUMENTS

| | | | | |
|---|---|---|---|---|
| 9,220,027 | B1 * | 12/2015 | Raleigh | H04W 12/088 |
| 2022/0360461 | A1 * | 11/2022 | Raleigh | H04W 28/24 |
| 2023/0007457 | A1 * | 1/2023 | Kleinrouweler | H04L 67/1014 |
| 2023/0026450 | A1 * | 1/2023 | Gundavelli | H04M 15/61 |
| 2023/0044250 | A1 * | 2/2023 | Miller | G06F 9/547 |
| 2023/0074771 | A1 * | 3/2023 | Nefedov | G06F 16/93 |
| 2023/0084606 | A1 * | 3/2023 | Yamada | G06F 30/18 |
| | | | | 703/1 |
| 2023/0123775 | A1 * | 4/2023 | Sivakumar | G06F 9/3877 |
| | | | | 709/220 |
| 2023/0135699 | A1 * | 5/2023 | Liao | H04W 4/50 |
| | | | | 370/252 |
| 2023/0156826 | A1 * | 5/2023 | Palermo | H04W 76/10 |
| | | | | 370/329 |
| 2023/0206755 | A1 * | 6/2023 | Jha | H04W 4/40 |
| | | | | 340/425.5 |
| 2023/0217253 | A1 * | 7/2023 | Palermo | G06F 9/45558 |
| | | | | 726/23 |
| 2023/0224953 | A1 * | 7/2023 | Xiong | H04L 5/0044 |
| | | | | 370/329 |

\* cited by examiner

*Primary Examiner* — Le H Luu
(74) *Attorney, Agent, or Firm* — Perilla Knox & Hildebrandt LLP; Thomas B. Hildebrandt

(57) ABSTRACT

Disclosed are various embodiments for improving self-healing and resiliency of radio-based networks through the use of a community model. In one embodiment, a community model graph representing a radio-based network is generated. Individual nodes of the community model graph correspond to one or more network functions of the radio-based network. Individual edges of the community model graph correspond to a respective network connection between the network function(s) of the radio-based network. The individual edges are assigned a respective measure of relative importance. An adverse health event is detected that impacts a plurality of network connections between network functions in the radio-based network. Self-healing activities for the network connections are prioritized based at least in part on the respective measures of relative importance corresponding to individual network connections.

20 Claims, 11 Drawing Sheets

SELF-HEALING AND RESILIENCY IN RADIO-BASED NETWORKS USING A COMMUNITY MODEL

BACKGROUND 5G is the fifth-generation technology standard for broadband cellular networks, which is planned eventually to take the place of the fourth-generation (4G) standard of Long-Term Evolution (LTE). 5G technology will offer greatly increased bandwidth, thereby broadening the cellular market beyond smartphones to provide last-mile connectivity to desktops, set-top boxes, laptops, Internet of Things (IoT) devices, and so on. Some 5G cells may employ frequency spectrum similar to that of 4G, while other 5G cells may employ frequency spectrum in the millimeter wave band. Cells in the millimeter wave band will have a relatively small coverage area but will offer much higher throughput than 4G.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
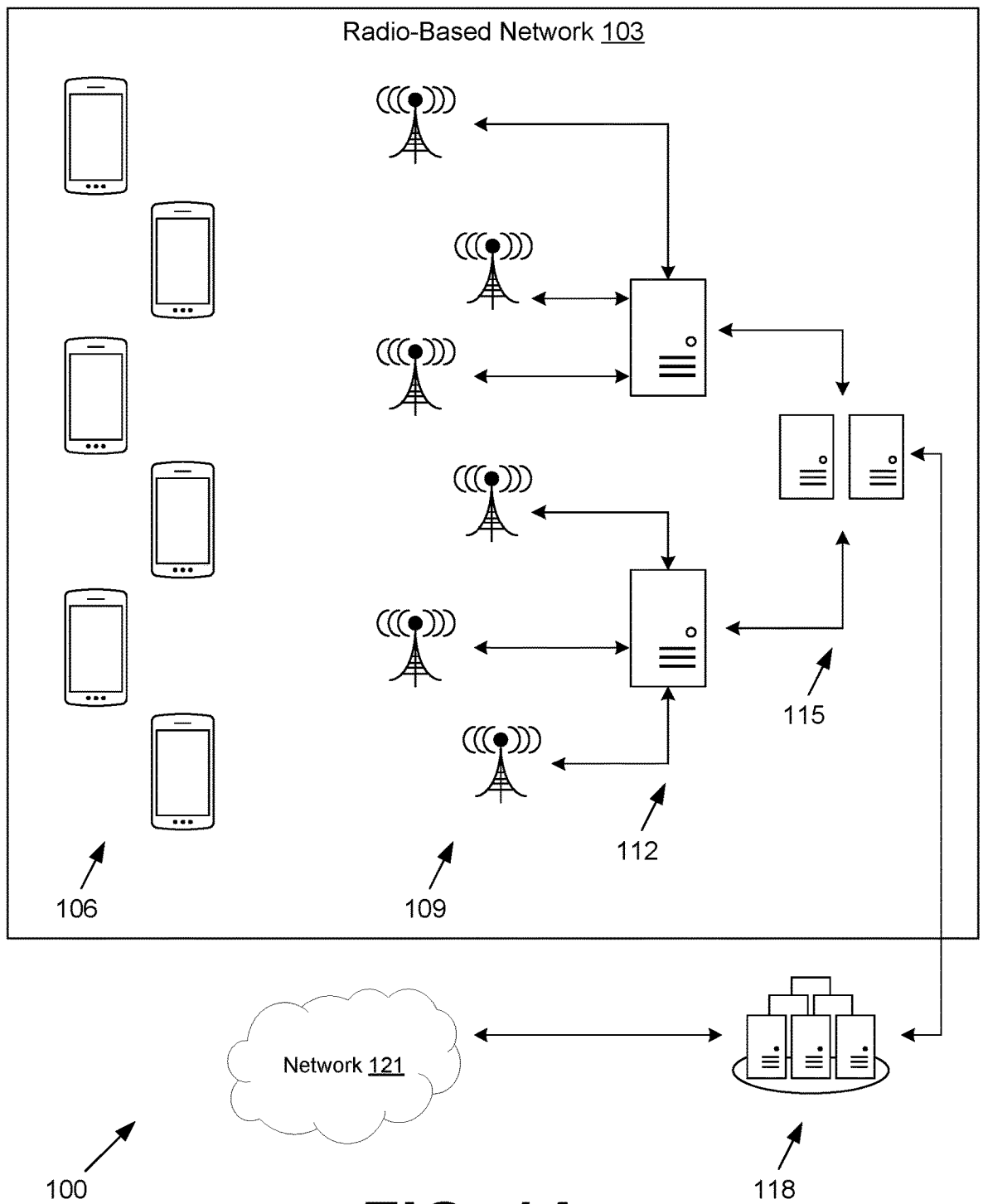
FIG. 1A is a drawing of an example of a communication network that is deployed and managed according to various embodiments of the present disclosure.

The present disclosure relates generally to improving availability and resiliency in radio-based networks. Distributed units (DUs) are computing devices that are typically deployed at cell sites of radio access networks (RANs) in radio-based networks. DUs operate at the lower layers of the RAN protocol stack, such as the Radio Link Control (RLC) sublayer, the Medium Access Control (MAC) sublayer, and the physical layer, depending on the particular implementation. This is in contrast to centralized units (CUs), which may be deployed at centralized locations and provide support for higher layers of the protocol stack, such as the Service Data Adaptation Protocol (SDAP), the Packet Data Convergence Protocol (PDCP), and the Radio Resource Control (RRC) protocol. Together, the DU and CU may correspond to the next generation node B (gNB) in fifth-generation (5G) networks, which enables user equipment (UEs) to connect to the core network. The DUs interface with one or more radio units (RUs) in order to communicate wirelessly with the UEs.

Radio-based network deployments include multiple network functions such as DUs and CUs that often require tedious manual configuration during deployment, maintenance, and failover procedures. Any single DU or CU is responsible for enabling network connectivity for multiple devices. For example, a DU may aggregate multiple RUs, while a CU may aggregate multiple DUs. Any downtime for a DU or CU is unsatisfactory, as it leads to service downtime, service level agreement (SLA) violations, and a degraded user experience. However, manual reconfigurations in the case of a network failure typically require the physical presence of engineers and introduce a great overhead.

Various embodiments of the present disclosure enable high availability and reliability in radio-based networks through service function chaining. In some embodiments, the network functions of a radio-based network, such as the RU, DU, CU, and core network functions, may be configured to utilize network service headers in sending or receiving data. Network service headers (NSH), as described in RFC 8300, are used to encapsulate original packets or frames for use in service function chaining. Service function chaining, as described in RFC 7665, defines an ordered set of service functions (i.e., a service function chain) through which network traffic is steered.

Through the use of NSH-aware network components and software-defined networking, how network traffic is processed in a radio-based network can be reconfigured dynamically in near real time. As will be described, network traffic from an RU that would normally be provided to a first DU using a static route can be rerouted through service function chaining to be provided to a second DU in order to handle failure or degraded performance conditions with the first DU. Likewise, network traffic from a DU that would normally be provided to a first CU using a static route can be rerouted through service function chaining to be provided to a second CU in order to handle failure or degraded performance conditions with the first CU.

The present disclosure also presents approaches for self-healing and resilience of radio-based networks using a community model that determines prioritization of connections between components. Typical network self-healing approaches do not provide any prioritization and are instead implemented with variants of breadth-first search (BFS) or greedy algorithms. A lack of prioritization is particularly problematic when multiple network failures occur concurrently.

Various embodiments of the present disclosure may employ the Girvan-Newman algorithm, an algorithm that is typically used to identify communities within social networks, to determine prioritization of network connections. The Girvan-Newman algorithm is one example of an algorithm that detects communities. For example, the Girvan-Newman algorithm detects communities by progressively removing edges from a graph representing a network. Rather than determining which edges are most central to communities, the Girvan-Newman algorithm focuses on edges that are most likely to be "between" different communities. In this regard, the algorithm generates a "betweenness" value for each edge that represents the number of shortest paths between pairs of nodes that run along the edge.

Various embodiments of the present disclosure identify communities within a graph model of a radio-based network to assist with self-healing and resilience. Nodes may be network functions, while edges may represent connections between the network functions. The betweenness value of a given edge or network connection, as identified using the Girvan-Newman algorithm for example, may represent the relative importance of the network connection to the connectivity provided via the radio-based network. From this information, self-healing processes in the radio-based network can prioritize healing connections having the higher betweenness values, which are associated with a greater impact to availability. Similarly, resilience in a radio-based network can be enhanced by proactively allocating resources to connections having higher betweenness values. For example, a particular connection may be prioritized to be upgraded or replicated based upon the connection having a relatively high betweenness value. As will be described, the self-healing processes and proactive resilience-building processes may employ service function chaining in order to implement the healing through network reconfiguration.

The DUs and CUs may employ a form of state synchronization to maintain consistent operations in the radio-based network when network flows are rerouted from one DU to another or from one CU to another. The state to be synchronized may correspond, for example, to lists of registered UE identifiers, network traffic logging data, billing data, and so forth. In a first scenario, the DUs may synchronize state from a CU and/or a core located in a regional or local data center. In a second scenario, the DUs may synchronize state from one or more other DUs. For example, one DU may be elected as a leader, and the other DUs will synchronize state with the leader DU. Alternatively, the DUs may exchange state with each other and operate based upon consensus. In the case that connectivity with the leader DU is lost, another DU may be elected as leader. Through these approaches, the radio-based network becomes more fault tolerant.

The radio-based network may use a core network infrastructure that may be provisioned dynamically and used in conjunction with one or more radio access networks operated by a cloud provider network and/or a plurality of communication service providers. While the radio-based networks may be provisioned on-demand, the radio-based networks may also be scaled up or down or terminated dynamically, thereby providing organizations with the capability to create an ephemeral radio-based network that may exist during a particular time period or periodically according to a schedule. Further, cell sites may be added to or removed from the radio-based network dynamically on demand. In various scenarios, an organization may create either a private radio-based network for internal use only or a radio-based network open to third-party customers using embodiments of the present disclosure.

Previous deployments of radio-based networks have relied upon manual deployment and configuration at each step of the process. This proved to be extremely time consuming and expensive. Further, in previous generations, software was inherently tied to vendor-specific hardware, thereby preventing customers from deploying alternative software. By contrast, with 5G, hardware is decoupled from the software stack, which allows more flexibility, and allows components of the radio-based network to be executed on cloud provider infrastructure. Using a cloud delivery model for a radio-based network, such as a 5G network, can facilitate handling network traffic from hundreds up to billions of connected devices and compute-intensive applications, while delivering faster speeds, lower latency, and more capacity than other types of networks.

Historically, enterprises have had to choose between performance and price when evaluating their enterprise connectivity solutions. Cellular networks may offer high performance, great indoor and outdoor coverage and advanced Quality of Service (QoS) connectivity features, but private cellular networks can be expensive and complex to manage. While Ethernet and Wi-Fi require less upfront investment and are easier to manage, enterprises often find that they can be less reliable, require a lot of work to get the best coverage, and do not offer QoS features such as guaranteed bit rate, latency and reliability.

Enterprises can freely deploy various 5G devices and sensors across the enterprise—factory floors, warehouses, lobbies, and communications centers—and manage these devices, enroll users, and assign QoS from a management console. With the disclosed technology, customers can assign constant bit rate throughput to all their devices (such as cameras, sensors, or IoT devices), reliable low latency connection to devices running on factory floors, and broadband connectivity to all handheld devices. The disclosed service can manage all the software needed to deliver connectivity that meets the specified constraints and requirements. This enables an entirely new set of applications that have strict QoS or high IoT device density requirements that traditionally have not been able to run on Wi-Fi networks. Further, the disclosed service can provide application development application programming interfaces (APIs) that expose and manage 5G capabilities like QoS, enabling customers to build applications that can fully utilize the latency and bandwidth capabilities of their network without having to understand the details of the network.

Additionally, the disclosed service can provide a private zone to run local applications within a cloud provider network. This private zone can be connected to and effectively part of a broader regional zone, and allows the customer to manage the private zone using the same APIs and tools as used in the cloud provider network. Like an availability zone, the private zone can be assigned a virtual private network subnet. An API can be used to create and assign subnets to all zones that the customer wishes to use, including the private zone and existing other zones. A management console may offer a simplified process for creating a private zone. Virtual machine instances and containers can be launched in the private zone just as in regional zones. Customers can configure a network gateway to define routes, assign IP addresses, set up network address translation (NAT), and so forth. Automatic scaling can be used to scale the capacity of virtual machine instances or containers as needed in the private zone. The same management and authentication APIs of the cloud provider network can be used within the private zone. In some cases, since cloud services available in the regional zone can be accessed remotely from private zones over a secure connection, these cloud services can be accessed without having to upgrade or modify the local deployment.

Various embodiments of the present disclosure may also bring the concept of elasticity and utility computing from the cloud computing model to radio-based networks and associated core networks. For example, the disclosed techniques can run core and radio access network functions and associated control plane management functions on cloud provider infrastructure, creating a cloud native core network and/or a cloud native radio access network (RAN). Such core and RAN network functions can be based on the 3rd Generation Partnership Project (3GPP) specifications in some implementations. By providing a cloud-native radio-based network, a customer may dynamically scale its radio-based network based on utilization, latency requirements, and/or other factors. Customers may also configure thresholds to receive alerts relating to radio-based network usage and excess capacity usage of their provisioned infrastructure, in order to more effectively manage provisioning of new infrastructure or deprovisioning of existing infrastructure based on their dynamic networking and workload requirements.

As one skilled in the art will appreciate in light of this disclosure, certain embodiments may be capable of achieving certain advantages, including some or all of the following: (1) improving fault-tolerance and reducing downtime in radio-based networks through the use of service function chaining to dynamically reconfigure radio-based networks; (2) improving resilience of radio-based networks by using a community model to identify relatively important network connections, so that such connections can be upgraded or load balancing can be employed; (3) improving self-healing processes in radio-based networks by prioritizing self-healing activities on network connections of relatively high importance; and so forth.

Among the benefits of the present disclosure is the ability to deploy and chain network functions together to deliver an end-to-end service that meets specified constraints and requirements. According to the present disclosure, network functions organized into microservices work together to provide end-to-end connectivity. One set of network functions are part of a radio network, running in cell towers and performing wireless signal to IP conversion. Other network functions run in large data centers performing subscriber related business logic and routing IP traffic to the internet and back. For applications to use the new capabilities of 5G such as low latency communication and reserved bandwidth, both of these types of network functions need to work together to appropriately schedule and reserve wireless spectrum, and perform real time compute and data processing. The presently disclosed techniques provide edge location hardware (as described further below) integrated with network functions that run across the entire network, from cell sites to Internet break-outs, and orchestrate the network functions to meet required Quality of Service (QoS) constraints. This enables an entirely new set of applications that have strict QoS requirements, from factory-based Internet of Things (IoT), to augmented reality (AR), to virtual reality (VR), to game streaming, to autonomous navigation support for connected vehicles, that previously could not run on a mobile network.

The described "elastic 5G" service provides and manages all of the hardware, software and network functions, required to build a network. In some embodiments, the network functions may be developed and managed by the cloud service provider; however, the described control plane can manage network functions across a range of providers, so that customers can use a single set of APIs to call and manage their choice of network functions on cloud infrastructure. The elastic 5G service beneficially automates the creation of an end-to-end 5G network, from hardware to network functions thus reducing the time to deploy and the operational cost of operating the network. By providing APIs that expose network capabilities, the disclosed elastic 5G service enables applications to simply specify the desired QoS as constraints and then deploys and chains the network functions together to deliver an end-to-end service that meets the specified requirements, thus making it possible to easily build new applications.

The present disclosure describes embodiments relating to the creation and management of a cloud native 5G core and/or a cloud native 5G RAN, and associated control plane components. Cloud native refers to an approach to building and running applications that exploits the advantages of the cloud computing delivery model such as dynamic scalability, distributed computing, and high availability (including geographic distribution, redundancy, and failover). Cloud native refers to how these applications are created and deployed to be suitable for deployment in a public cloud. While cloud native applications can be (and often are) run in the public cloud, they also can be run in an on-premises data center. Some cloud native applications can be containerized, for example, having different parts, functions, or subunits of the application packaged in their own containers, which can be dynamically orchestrated so that each part is actively scheduled and managed to optimize resource utilization. These containerized applications can be architected using a microservices architecture to increase the overall agility and maintainability of the applications.

In a microservices architecture, an application is arranged as a collection of smaller subunits ("microservices") that can be deployed and scaled independently from one another, and which can communicate with one another over a network. These microservices are typically fine-grained, in that they have specific technical and functional granularity, and often implement lightweight communications protocols. The microservices of an application can perform different functions from one another, can be independently deployable, and may use different programming languages, databases, and hardware/software environments from one another. Decomposing an application into smaller services beneficially improves modularity of the application, enables replacement of individual microservices as needed, and parallelizes development by enabling teams to develop, deploy, and maintain their microservices independently from one another. A microservice may be deployed using a virtual machine, container, or serverless function, in some examples. The disclosed core and RAN software may follow a microservices architecture such that the described radio-based networks are composed of independent subunits that can be deployed and scaled on demand.

Turning now to FIG. 1A, shown is an example of a communication network 100 that is deployed and managed according to various embodiments of the present disclosure.

The communication network 100 includes a radio-based network (RBN) 103, which may correspond to a cellular network such as a fourth-generation (4G) Long-Term Evolution (LTE) network, a fifth-generation (5G) network, a 4G-5G hybrid core with both 4G and 5G RANs, a sixth-generation (6G) network, or another network that provides wireless network access. The radio-based network 103 may be operated by a cloud service provider for an enterprise, a non-profit, a school system, a governmental entity, a third-party communication service provider, or another organization. Although referred to as a private network, the radio-based network 103 may use private network addresses or public network addresses in various embodiments.

Various deployments of the radio-based network 103 can include one or more of a core network and a RAN network, as well as a control plane for running the core and/or RAN network on cloud provider infrastructure. As described above, these components can be developed in a cloud native fashion, for example using a microservices architecture, such that centralized control and distributed processing is used to scale traffic and transactions efficiently. These components may be based on the 3GPP specifications by following an application architecture in which control plane and user plane processing is separated (CUPS Architecture).

The radio-based network 103 provides wireless network access to a plurality of wireless devices 106, which may be mobile devices or fixed location devices. In various examples, the wireless devices 106 may include smartphones, connected vehicles, IoT devices, sensors, machinery (such as in a manufacturing facility), hotspots, and other devices. The wireless devices 106 are sometimes referred to as UE or customer premises equipment (CPE).

The radio-based network 103 can include capacity provisioned on one or more RANs that provide the wireless network access to the plurality of wireless devices 106 through a plurality of cell sites 109. The RANs may be operated by a cloud network provider or different communication service providers. Each of the cell sites 109 may be equipped with one or more antennas and one or more radio units that send and receive wireless data signals to and from the wireless devices 106. The antennas may be configured for one or more frequency bands, and the radio units may also be frequency agile or frequency adjustable. The antennas may be associated with a certain gain or beamwidth in order to focus a signal in a particular direction or azimuthal range, potentially allowing reuse of frequencies in a different direction. Further, the antennas may be horizontally, vertically, or circularly polarized. In some examples, a radio unit may utilize multiple-input, multiple-output (MIMO) technology to send and receive signals. As such, the RAN implements a radio access technology to enable radio connection with wireless devices 106, and provides connection with the radio-based network's core network. Components of the RAN include a base station and antennas that cover a given physical area, as well as required core network items for managing connections to the RAN.

Data traffic is often routed through a fiber transport network consisting of multiple hops of layer 3 routers (e.g., at aggregation sites) to the core network. The core network is typically housed in one or more data centers. The core network typically aggregates data traffic from end devices, authenticates subscribers and devices, applies personalized policies, and manages the mobility of the devices before routing the traffic to operator services or the Internet. A 5G Core for example can be decomposed into a number of microservice elements with control and user plane separation. Rather than physical network elements, a 5G Core can comprise virtualized, software-based network functions (deployed for example as microservices) and can therefore be instantiated within Multi-access Edge Computing (MEC) cloud infrastructures. The network functions of the core network can include a User Plane Function (UPF), Access and Mobility Management Function (AMF), and Session Management Function (SMF), described in more detail below. For data traffic destined for locations outside of the communication network 100, network functions typically include a firewall through which traffic can enter or leave the communication network 100 to external networks such as the Internet or a cloud provider network. Note that in some embodiments, the communication network 100 can include facilities to permit traffic to enter or leave from sites further downstream from the core network (e.g., at an aggregation site or radio-based network 103).

The UPF provides an interconnect point between the mobile infrastructure and the Data Network (DN), i.e., encapsulation and decapsulation of General Packet Radio Service (GPRS) tunneling protocol for the user plane (GTP-U). The UPF can also provide a session anchor point for providing mobility within the RAN, including sending one or more end marker packets to the RAN base stations. The UPF can also handle packet routing and forwarding, including directing flows to specific data networks based on traffic matching filters. Another feature of the UPF includes per-flow or per-application QoS handling, including transport level packet marking for uplink (UL) and downlink (DL), and rate limiting. The UPF can be implemented as a cloud native network function using modern microservices methodologies, for example being deployable within a serverless framework (which abstracts away the underlying infrastructure that code runs on via a managed service).

The AMF can receive the connection and session information from the wireless devices 106 or the RAN and can handle connection and mobility management tasks. For example, the AMF can manage handovers between base stations in the RAN. In some examples the AMF can be considered as the access point to the 5G core, by terminating certain RAN control plane and wireless device 106 traffic. The AMF can also implement ciphering and integrity protection algorithms.

The SMF can handle session establishment or modification, for example by creating, updating and removing Protocol Data Unit (PDU) sessions and managing session context within the UPF. The SMF can also implement Dynamic Host Configuration Protocol (DHCP) and IP Address Management (IPAM). The SMF can be implemented as a cloud native network function using modern microservices methodologies.

Various network functions to implement the radio-based network 103 may be deployed in distributed computing devices 112, which may correspond to general-purpose computing devices configured to perform the network functions. For example, the distributed computing devices 112 may execute one or more virtual machine instances that are configured in turn to execute one or more services that perform the network functions. In one embodiment, the distributed computing devices 112 are ruggedized machines that are deployed at each cell site. The distributed computing devices 112 may be operated as an extension of a cloud provider network, with DU functions being executed, for example, by a container cluster upon the distributed computing devices 112. Further, the distributed computing devices 112 may be managed by the cloud provider network.

One or more centralized computing devices 115 may perform various network functions at a central site operated by the customer. For example, the centralized computing devices 115 may be centrally located on premises of the customer in a conditioned server room. The centralized computing devices 115 may execute one or more virtual machine instances that are configured in turn to execute one or more services that perform the network functions. In some cases, the centralized computing devices 115 may be located in a data center of a cloud provider network, rather than upon a customer's premises.

In one or more embodiments, network traffic from the radio-based network 103 is backhauled to one or more core computing devices 118 that may be located at one or more data centers situated remotely from the customer's site. The core computing devices 118 may also perform various network functions, including routing network traffic to and from the network 121, which may correspond to the Internet and/or other external public or private networks. The core computing devices 118 may perform functionality related to the management of the communication network 100 (e.g., billing, mobility management, etc.) and transport functionality to relay traffic between the communication network 100 and other networks. The core network sits between the RAN and external networks, such as the Internet and the public switched telephone network, and performs features such as authentication of UE, secure session management, user accounting, and handover of mobile UE between different RAN sites. As described herein, the core network functions typically performed by the core computing devices 118 may instead be performed by the distributed computing devices 112.

Collectively, the radio unit (RU), distributed unit (DU), and central unit (CU) convert the analog radio signal received from the antenna into a digital packet that can be routed over a network, and similarly they convert digital packets into radio signals that can be transmitted by the antenna. This signal transformation is accomplished by a sequence of network functions which can be distributed amongst the RU, DU, and CU in various ways to achieve different balances of latency, throughput, and network performance. These are referred to as "functional splits" of the RAN.

The network functions implemented in the RAN correspond to the lowest three network layers in the seven layer OSI model of computer networking. The physical Layer, PHY, or layer 1 (L1) is the first and lowest layer in the OSI model. In a radio-based network 103, the PHY is the layer that sends and receives radio signals. This can be split into two portions: a "high PHY" and "low PHY." Each of these can be considered a network function. The high PHY converts binary bits into electrical pulses that represent the binary data, and the low PHY then converts these electric pulses into radio waves to be transmitted wirelessly by the antennae. The PHY similarly converts received radio waves into a digital signal. This layer may be implemented by a specialized PHY chip.

The PHY interfaces with the data link layer—layer 2 (L2) in the OSI model. The primary task of the L2 is to provide an interface between the higher transport layers and the PHY. The 5G L2 has three sublayers: media access control (MAC), Radio Link Control (RLC), and Packet Data Convergence Protocol (PDCP). Each of these can be considered a network function. The PDCP provides security of radio resource control (RRC) traffic and signaling data, sequence numbering and sequential delivery of RRC messages and IP packets, and IP packet header compression. The RLC protocol provides control of the radio link. The MAC protocol maps information between logical and transport channels.

The data link layer interfaces with layer 3 (L3) in the OSI model, the network layer. The 5G L3 is also referred to as the Radio Resource Control (RRC) layer and is responsible for functions such as packet forwarding, quality of service management, and the establishment, maintenance, and release of a RRC connection between the UE and RAN.

Various functional splits can be chosen for a RAN. The functional splits define different sets of the L1 and L2 functions which are run on the RU versus on the CU and DU. The L3 is also run on the CU. In a RAN architecture following split 7, for example, the functionality of the baseband unit (BBU) used in previous wireless network generations is split into two functional units: the DU which is responsible for real time L1 and L2 scheduling functions, and the CU which is responsible for non-real time, higher L2 and L3 functions. By contrast, in a RAN architecture following split 2, for example, only the PDCP from L2 is handled by the DU and CU, while RLC, MAC, PHY, and radio-frequency signals (RF) are handled by the RU. In split 5, for example, the DU and CU handle PDCP, RLC, and part of the MAC functions, while the RU handles part of the MAC as well as PHY and RF. In split 6, for example, the DU and CU handle PDCP, RLC, MAC, and the RU handles only PHY and RF. In split 8, for example, the DU and CU handle PDCP, RLC, MAC, and PHY, while the RU handles just RF.

Figure 1B:
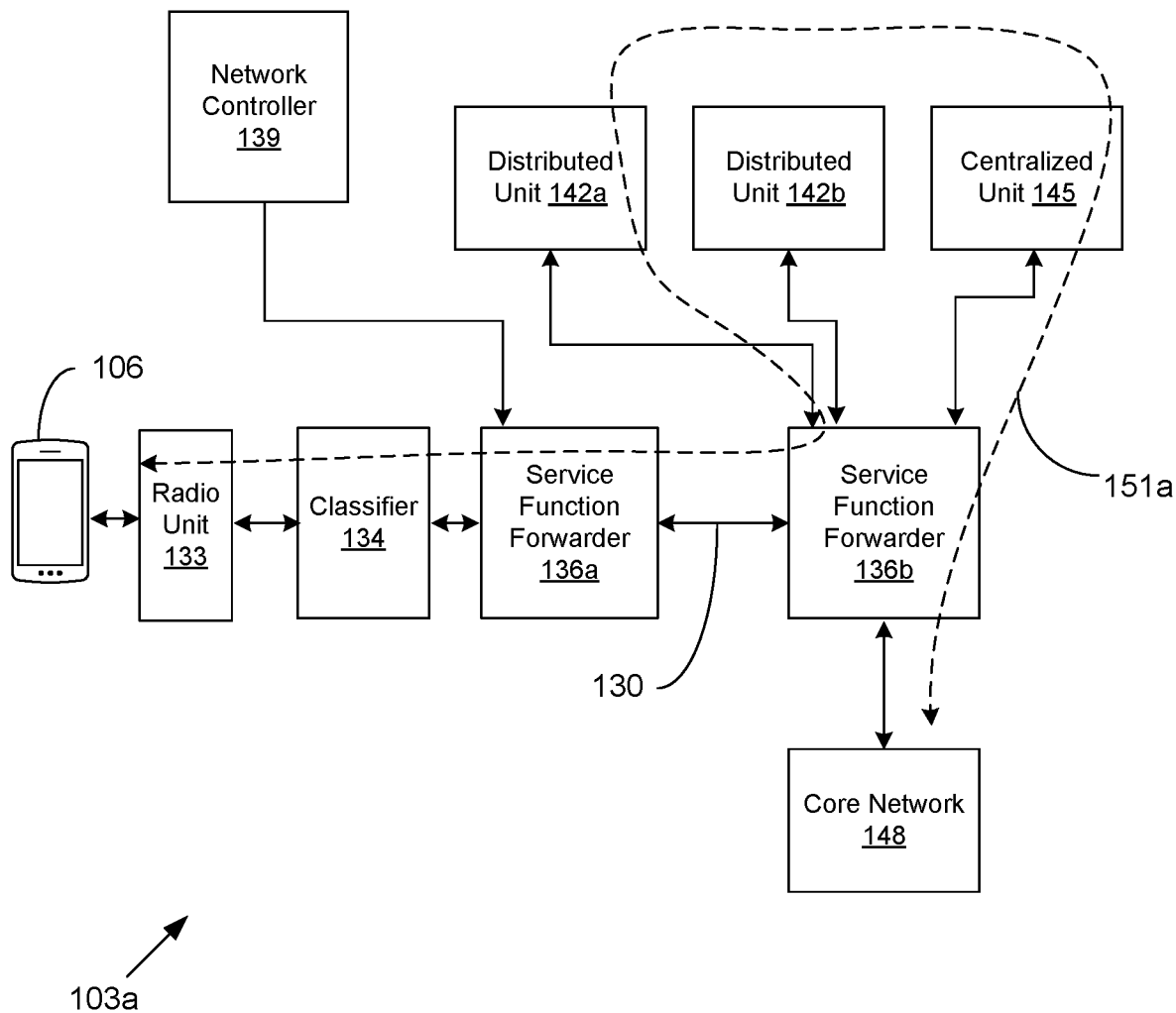
FIGS. 1B and 1C illustrate example service function chain scenarios in a radio-based network according to one or more embodiments.

Turning now to FIG. 1B, shown is one example of a radio-based network 103a according to a first service function chain scenario. In the radio-based network 103a, network traffic originating from a source such as a client device 106 traverses a number of network links 130 and networking components. In various scenarios, the network links 130 may be part of a software-defined network, such that the network links 130 represent virtual local area network (VLAN) links over a physical substrate.

In one example, for uplink data traffic, the network traffic from the client device 106 is received initially by a radio unit (RU) 133. The network traffic may then be provided to a classifier 134, which may select from multiple overlay networks or service function chains, and then encapsulate the network traffic by adding a network service header (NSH) identifying the particular overlay network or service function chain. In another example, the reverse path is used for downlink data traffic in which the classifier 134 is invoked before or after the downlink data traffic reaches a UPF, and a service function forwarder 136 may be between the UPF and a centralized unit (CU).

The network traffic is then provided to a service function forwarder 136a. In some embodiments, the service function forwarder 136a may include the functionality of the classifier 134, or the functionality of the classifier 134 may be included in the RU 133 or in a network controller 139. The operation of the service function forwarder 136a may be configured by a network controller 139. The network traffic may be forwarded to another service function forwarder 136b that may also be configured by the network controller 139. The service function forwarder 136b in this example scenario may be in data communication with a first distributed unit 142a, a second distributed unit 142b, one or more centralized units 145, one or more core networks 148, and/or other network components.

The overlay data path 151a corresponds to a path for processing network traffic (e.g., control plane network traffic) as configured by a service function chain. In this example scenario, data sent from the client device 106 is received by the radio unit 133, and then forwarded to the service function forwarder 136a. The service function forwarder 136a forwards the network traffic to the service function forwarder 136b. The service function forwarder 136b is configured to forward the network traffic from the radio unit 133 to the first distributed unit 142a for processing, then to the centralized unit 145 for processing, and finally to the core network 148 for processing. In this example, the radio unit 133, the distributed unit 142a, the centralized unit 145, and the core network 148 may be considered component service functions of the service function chain. The flexibility of this architecture is in contrast to an architecture where the radio unit 133 is connected to the distributed unit 142a by a fixed link, where the distributed unit 142a is connected to the centralized unit 145 by a fixed link, and where the centralized unit 145 is connected to the core network 148 by a fixed link. In various implementations, the radio units 133, the distributed units 142, and/or the centralized unit 145 need not be separate physical devices and may instead be implemented by virtual machine instances that are hosted on an edge server, in a customer local data center, in a local zone, or in a regional zone.

Figure 1C:
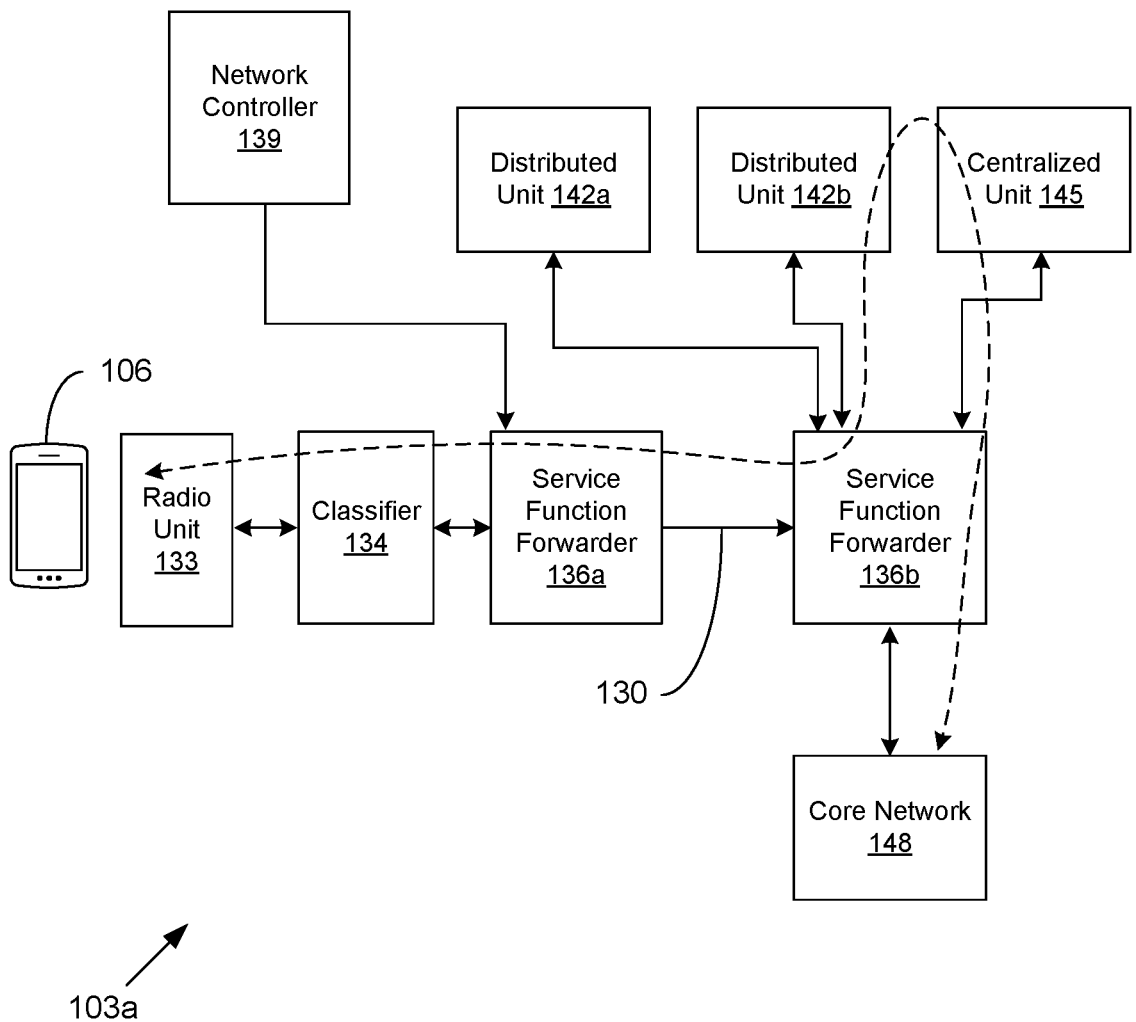

Continuing now to FIG. 1C, shown is one example of a radio-based network 103a according to a second service function chain scenario. Compared to the radio-based network 103a of FIG. 1B, the radio-based network 103a of FIG. 1C utilizes a different overlay data path 151b, representing a modification or replacement of the overlay data path 151a (FIG. 1B). In the overlay data path 151b, the network traffic from the radio unit 133 is instead forwarded by the service function forwarder 136a to the distributed unit 142b, and then from the distributed unit 142b to the centralized unit 145, which effectively swaps out the distributed unit 142a for the distributed unit 142b in processing the network traffic originating from the client device 106. This modification to the service function chain may be implemented in an automated way based at least in part on a rule set by the network controller 139.

The flexibility afforded by service function chaining may be used to improve network resiliency by load balancing an overloaded network function instantiation before it fails and also to swap out a network function instantiation associated with an adverse health event (e.g., a network function instantiation that has failed or is near failure). In modifying the service function chain, state associated with the flow of the network traffic being processed by the distributed unit 142a may be replicated to the distributed unit 142b, when possible, to ensure that processing of the flow of network traffic continues by the distributed unit 142b in a seamless manner.

Figure 1D:
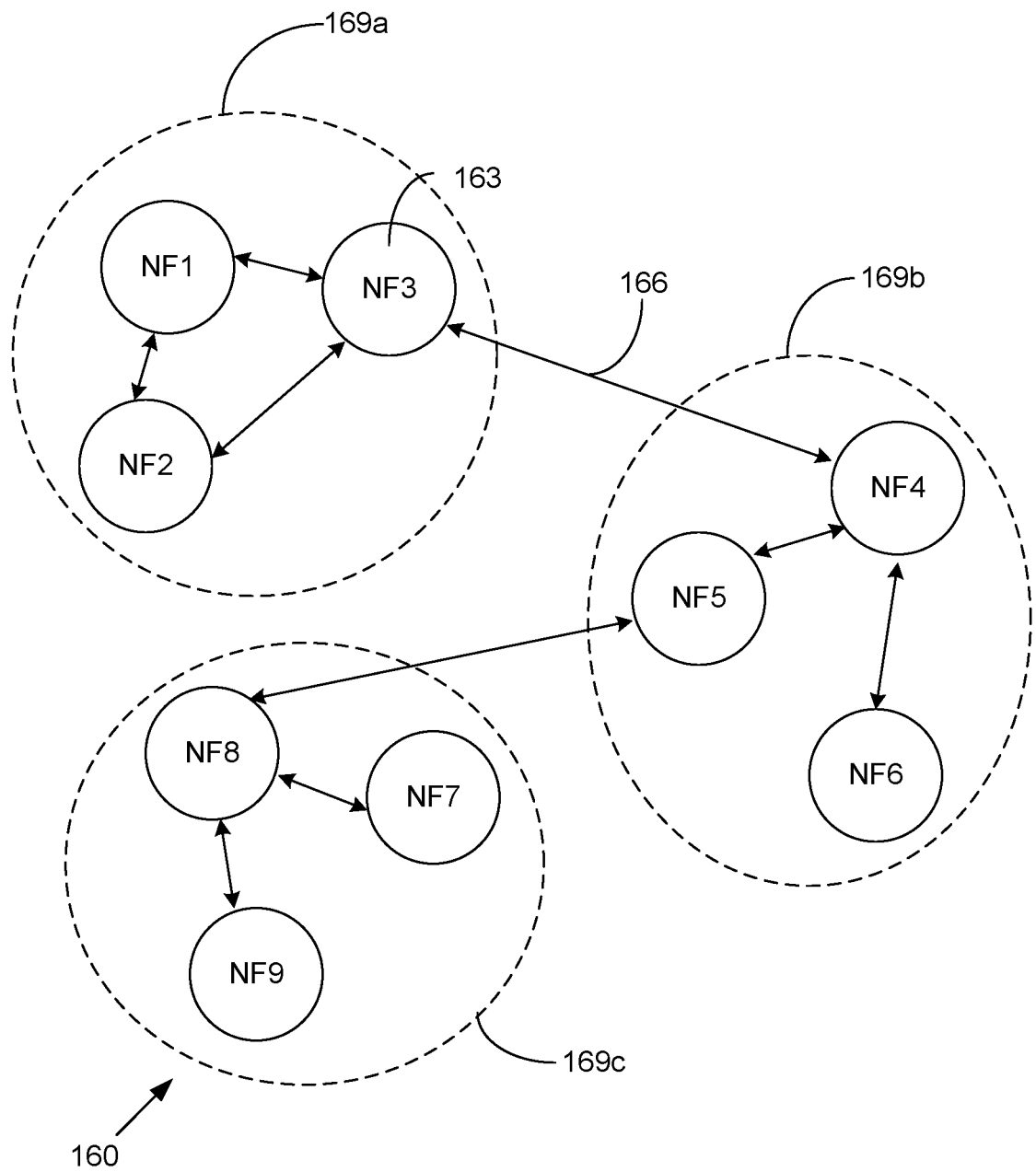
FIG. 1D illustrates one example of a community model graph generated for a radio-based network according to one or more embodiments.

Referring next to FIG. 1D, shown is one example of a community model graph 160 generated for a radio-based network 103. In generating the community model graph 160, the radio-based network 103 may be conceptualized as a plurality of nodes 163 that individually correspond to network functions of the radio-based network 103 (labeled NF1 through NF9), and a plurality of edges 166 that individually correspond to network connections between the network functions or nodes 163. In some cases, the radio-based network 103 may be a fully or partially connected mesh network, with redundant network connections between one or more nodes 163.

A community identifying algorithm is executed on an input graph generated from representational network information. For example, the Girvan-Newman algorithm may be executed on the input graph to identify one or more logical communities 169. In the Girvan-Newman algorithm, the logical communities 169 are detected by progressively removing edges 166 from the input graph. The connected components of the remaining graph correspond to the logical communities 169. Instead of trying to construct a measure that indicates which edges 166 are the most central to logical communities 169, the Girvan-Newman algorithm focuses on edges 166 that are most likely between logical communities 169.

In the example of FIG. 1D, three logical communities 169a, 169b, and 169c are identified. The logical community 169a comprises nodes 163 corresponding to NF1, NF2, and NF3; the logical community 169b comprises nodes 163 corresponding to NF4, NF5, and NF6; and the logical community 169c comprises nodes 163 corresponding to NF7, NF8, and NF9. From the community identifying algorithm, measures of "edge betweenness" or relative importance may be assigned to each network connection or edge 166 in the community model graph 160. In this non-limiting example, the network connections respectively between NF3 and NF4 and between NF5 and NF8 may be identified as being between the logical communities 169, and consequently these network connections may have a high edge betweenness value or a high measure of relative importance to the radio-based network 103.

The information that the network connections respectively between NF3 and NF4 and between NF5 and NF8 have a high measure of relative importance may be used for improving self-healing and resiliency. As an example, these network connections may be prioritized for a bandwidth upgrade or replicated network functions for load balancing. As another example, when multiple network connections are impacted by an adverse health event, the network connections may be prioritized for restoration or self-healing according to the respective measures of relative importance. By contrast, network connections that are identified as within logical communities 169, such as the network connection between NF2 and NF3, may be deprioritized. Service function chaining may be used in some embodiments to reroute network traffic and perform the self-healing in the radio-based network 103.

Figure 2A:
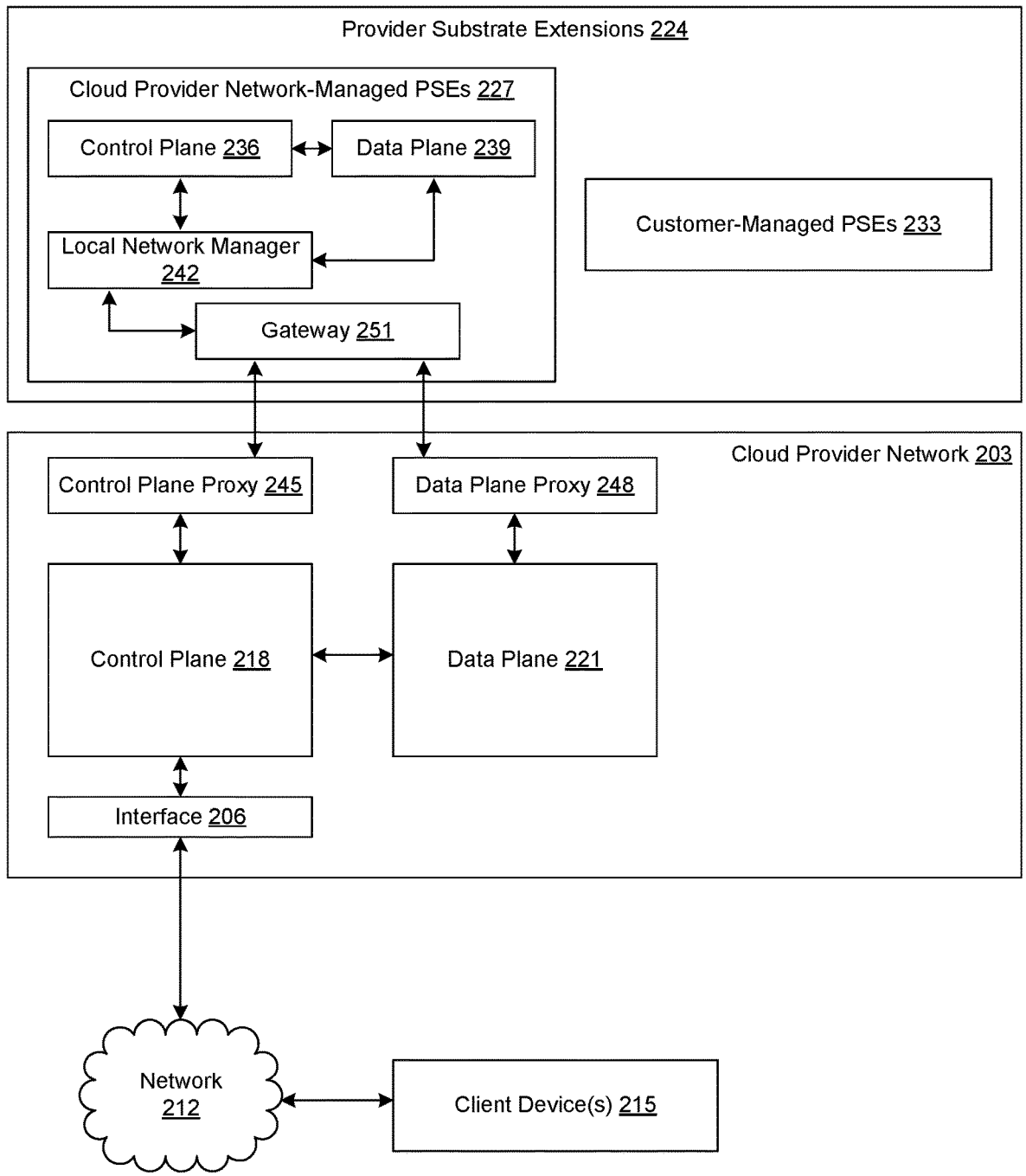
FIG. 2A illustrates an example of a networked environment including a cloud provider network and further including various provider substrate extensions of the cloud provider network, which may be used in various locations within the communication network of FIG. 1A, according to some embodiments of the present disclosure.

FIG. 2A illustrates an example of a networked environment 200 including a cloud provider network 203 and further including various provider substrate extensions of the cloud provider network 203, which may be used in combination with on-premise customer deployments within the communication network 100 of FIG. 1A, according to some embodiments. A cloud provider network 203 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 203 can provide on-demand, scalable computing platforms to users through a network, for example, allowing users to have at their disposal scalable "virtual computing devices" via their use of the compute servers (which provide compute instances via the usage of one or both of central processing units (CPUs) and graphics processing units (GPUs), optionally with local storage) and block store servers (which provide virtualized persistent block storage for designated compute instances). These virtual computing devices have attributes of a personal computing device including hardware (various types of processors, local memory, random access memory (RAM), hard-disk, and/or solid-state drive (SSD) storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, API, software development kit (SDK), or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires.

As indicated above, users can connect to virtualized computing devices and other cloud provider network 203 resources and services, and configure and manage telecommunications networks such as 5G networks, using various interfaces 206 (e.g., APIs) via intermediate network(s) 212. An API refers to an interface 206 and/or communication protocol between a client device 215 and a server, such that if the client makes a request in a predefined format, the client should receive a response in a specific format or cause a defined action to be initiated. In the cloud provider network context, APIs provide a gateway for customers to access cloud infrastructure by allowing customers to obtain data from or cause actions within the cloud provider network 203, enabling the development of applications that interact with resources and services hosted in the cloud provider network 203. APIs can also enable different services of the cloud provider network 203 to exchange data with one another. Users can choose to deploy their virtual computing systems to provide network-based services for their own use and/or for use by their customers or clients.

The cloud provider network 203 can include a physical network (e.g., sheet metal boxes, cables, rack hardware) referred to as the substrate. The substrate can be considered as a network fabric containing the physical hardware that runs the services of the provider network. The substrate may be isolated from the rest of the cloud provider network 203, for example it may not be possible to route from a substrate network address to an address in a production network that runs services of the cloud provider, or to a customer network that hosts customer resources.

The cloud provider network 203 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., virtual networks that may be referred to as virtual private clouds (VPCs), port/protocol firewall configurations that may be referred to as security groups). A mapping service (not shown) can coordinate the routing of these network packets. The mapping service can be a regional distributed look up service that maps the combination of overlay internet protocol (IP) and network identifier to substrate IP so that the distributed substrate computing devices can look up where to send packets.

To illustrate, each physical host device (e.g., a compute server, a block store server, an object store server, a control server) can have an IP address in the substrate network. Hardware virtualization technology can enable multiple operating systems to run concurrently on a host computer, for example as virtual machines (VMs) on a compute server. A hypervisor, or virtual machine monitor (VMM), on a host allocates the host's hardware resources amongst various VMs on the host and monitors the execution of the VMs. Each VM may be provided with one or more IP addresses in an overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 203. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., IP addresses visible to customers) to substrate IP addresses (IP addresses not visible to customers), which can be accessed by various processes on the cloud provider network 203 for routing packets between endpoints.

As illustrated, the traffic and operations of the cloud provider network substrate may broadly be subdivided into two categories in various embodiments: control plane traffic carried over a logical control plane 218 and data plane operations carried over a logical data plane 221. While the data plane 221 represents the movement of user data through the distributed computing system, the control plane 218 represents the movement of control signals through the distributed computing system. The control plane 218 generally includes one or more control plane components or services distributed across and implemented by one or more control servers. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane 221 includes customer resources that are implemented on the cloud provider network (e.g., computing instances, containers, block storage volumes, databases, file storage). Data plane traffic generally includes non-administrative operations such as transferring data to and from the customer resources.

The control plane components are typically implemented on a separate set of servers from the data plane servers, and control plane traffic and data plane traffic may be sent over separate/distinct networks. In some embodiments, control plane traffic and data plane traffic can be supported by different protocols. In some embodiments, messages (e.g., packets) sent over the cloud provider network 203 include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane 221 can include one or more compute servers, which may be bare metal (e.g., single tenant) or may be virtualized by a hypervisor to run multiple VMs (sometimes referred to as "instances") or microVMs for one or more customers. These compute servers can support a virtualized computing service (or "hardware virtualization service") of the cloud provider network 203. The virtualized computing service may be part of the control plane 218, allowing customers to issue commands via an interface 206 (e.g., an API) to launch and manage compute instances (e.g., VMs, containers) for their applications. The virtualized computing service may offer virtual compute instances with varying computational and/or memory resources. In one embodiment, each of the virtual compute instances may correspond to one of several instance types. An instance type may be characterized by its hardware type, computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane 221 can also include one or more block store servers, which can include persistent storage for storing volumes of customer data as well as software for managing these volumes. These block store servers can support a managed block storage service of the cloud provider network 203. The managed block storage service may be part of the control plane 218, allowing customers to issue commands via the interface 206 (e.g., an API) to create and manage volumes for their applications running on compute instances. The block store servers include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte (TB) or more in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the cloud provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary replicas. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane 221 can also include one or more object store servers, which represent another type of storage within the cloud provider network. The object storage servers include one or more servers on which data is stored as objects within resources referred to as buckets and can be used to support a managed object storage service of the cloud provider network. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that represent a point-in-time view of the data of a volume.

A provider substrate extension 224 ("PSE") provides resources and services of the cloud provider network 203 within a separate network, such as a telecommunications network, thereby extending functionality of the cloud provider network 203 to new locations (e.g., for reasons related to latency in communications with customer devices, legal compliance, security, etc.). In some implementations, a PSE 224 can be configured to provide capacity for cloud-based workloads to run within the telecommunications network. In some implementations, a PSE 224 can be configured to provide the core and/or RAN functions of the telecommunications network, and may be configured with additional hardware (e.g., radio access hardware). Some implementations may be configured to allow for both, for example by allowing capacity unused by core and/or RAN functions to be used for running cloud-based workloads.

As indicated, such provider substrate extensions 224 can include cloud provider network-managed provider substrate extensions 227 (e.g., formed by servers located in a facility such as a customer's premises or a cellular communication network separate from those associated with the cloud provider network 203 but where such servers are still managed by the cloud provider), customer-managed provider substrate extensions 233 (e.g., formed by servers located on-premise in a customer or partner facility), among other possible types of substrate extensions.

As illustrated in the example provider substrate extension 224, a provider substrate extension 224 can similarly include a logical separation between a control plane 236 and a data plane 239, respectively extending the control plane 218 and data plane 221 of the cloud provider network 203. The provider substrate extension 224 may be pre-configured, e.g. by the cloud provider network operator, with an appropriate combination of hardware with software and/or firmware elements to support various types of computing-related resources, and to do so in a manner that mirrors the experience of using the cloud provider network 203. For example, one or more provider substrate extension location servers can be provisioned by the cloud provider for deployment within a provider substrate extension 224. As described above, the cloud provider network 203 may offer a set of predefined instance types, each having varying types and quantities of underlying hardware resources. Each instance type may also be offered in various sizes. In order to enable customers to continue using the same instance types and sizes in a provider substrate extension 224 as they do in the region, the servers can be heterogeneous servers. A heterogeneous server can concurrently support multiple instance sizes of the same type and may be also reconfigured to host whatever instance types are supported by its underlying hardware resources. The reconfiguration of the heterogeneous server can occur on-the-fly using the available capacity of the servers, that is, while other VMs are still running and consuming other capacity of the provider substrate extension location servers. This can improve utilization of computing resources within the edge location by allowing for better packing of running instances on servers, and also provides a seamless experience regarding instance usage across the cloud provider network 203 and the cloud provider network-managed provider substrate extension 227.

The provider substrate extension servers can host one or more compute instances. Compute instances can be VMs, or containers that package up code and all its dependencies, so that an application can run quickly and reliably across computing environments (e.g., including VMs and microVMs). In addition, the servers may host one or more data volumes, if desired by the customer. In the region of a cloud provider network 203, such volumes may be hosted on dedicated block store servers. However, due to the possibility of having a significantly smaller capacity at a provider substrate extension 224 than in the region, an optimal utilization experience may not be provided if the provider substrate extension 224 includes such dedicated block store servers. Accordingly, a block storage service may be virtualized in the provider substrate extension 224, such that one of the VMs runs the block store software and stores the data of a volume. Similar to the operation of a block storage service in the region of a cloud provider network 203, the volumes within a provider substrate extension 224 may be replicated for durability and availability. The volumes may be provisioned within their own isolated virtual network within the provider substrate extension 224. The compute instances and any volumes collectively make up a data plane 239 extension of the provider network data plane 221 within the provider substrate extension 224.

The servers within a provider substrate extension 224 may, in some implementations, host certain local control plane components, for example, components that enable the provider substrate extension 224 to continue functioning if there is a break in the connection back to the cloud provider network 203. Examples of these components include a migration manager that can move compute instances between provider substrate extension servers if needed to maintain availability, and a key value data store that indicates where volume replicas are located. However, generally the control plane 236 functionality for a provider substrate extension 224 will remain in the cloud provider network 203 in order to allow customers to use as much resource capacity of the provider substrate extension 224 as possible.

The migration manager may have a centralized coordination component that runs in the region, as well as local controllers that run on the PSE servers (and servers in the cloud provider's data centers). The centralized coordination component can identify target edge locations and/or target hosts when a migration is triggered, while the local controllers can coordinate the transfer of data between the source and target hosts. The described movement of the resources between hosts in different locations may take one of several forms of migration. Migration refers to moving virtual machine instances (and/or other resources) between hosts in a cloud computing network, or between hosts outside of the cloud computing network and hosts within the cloud. There are different types of migration including live migration and reboot migration. During a reboot migration, the customer experiences an outage and an effective power cycle of their virtual machine instance. For example, a control plane service can coordinate a reboot migration workflow that involves tearing down the current domain on the original host and subsequently creating a new domain for the virtual machine instance on the new host. The instance is rebooted by being shut down on the original host and booted up again on the new host.

Live migration refers to the process of moving a running virtual machine or application between different physical machines without significantly disrupting the availability of the virtual machine (e.g., the down time of the virtual machine is not noticeable by the end user). When the control plane executes a live migration workflow it can create a new "inactive" domain associated with the instance, while the original domain for the instance continues to run as the "active" domain. Memory (including any in-memory state of running applications), storage, and network connectivity of the virtual machine are transferred from the original host with the active domain to the destination host with the inactive domain. The virtual machine may be briefly paused to prevent state changes while transferring memory contents to the destination host. The control plane can transition the inactive domain to become the active domain and demote the original active domain to become the inactive domain (sometimes referred to as a "flip"), after which the inactive domain can be discarded.

Techniques for various types of migration involve managing the critical phase—the time when the virtual machine instance is unavailable to the customer—which should be kept as short as possible. In the presently disclosed migration techniques this can be especially challenging, as resources are being moved between hosts in geographically separate locations which may be connected over one or more intermediate networks. For live migration, the disclosed techniques can dynamically determine an amount of memory state data to pre-copy (e.g., while the instance is still running on the source host) and to post-copy (e.g., after the instance begins running on the destination host), based for example on latency between the locations, network bandwidth/usage patterns, and/or on which memory pages are used most frequently by the instance. Further, a particular time at which the memory state data is transferred can be dynamically determined based on conditions of the network between the locations. This analysis may be performed by a migration management component in the region, or by a migration management component running locally in the source edge location. If the instance has access to virtualized storage, both the source domain and target domain can be simultaneously attached to the storage to enable uninterrupted access to its data during the migration and in the case that rollback to the source domain is required.

Server software running at a provider substrate extension 224 may be designed by the cloud provider to run on the cloud provider substrate network, and this software may be enabled to run unmodified in a provider substrate extension 224 by using local network manager(s) 242 to create a private replica of the substrate network within the edge location (a "shadow substrate"). The local network manager(s) 242 can run on provider substrate extension 224 servers and bridge the shadow substrate with the provider substrate extension 224 network, for example, by acting as a virtual private network (VPN) endpoint or endpoints between the provider substrate extension 224 and the proxies 245, 248 in the cloud provider network 203 and by implementing the mapping service (for traffic encapsulation and decapsulation) to relate data plane traffic (from the data plane proxies 248) and control plane traffic (from the control plane proxies 245) to the appropriate server(s). By implementing a local version of the provider network's substrate-overlay mapping service, the local network manager(s) 242 allow resources in the provider substrate extension 224 to seamlessly communicate with resources in the cloud provider network 203. In some implementations, a single local network manager 242 can perform these actions for all servers hosting compute instances in a provider substrate extension 224. In other implementations, each of the server hosting compute instances may have a dedicated local network manager 242. In multi-rack edge locations, inter-rack communications can go through the local network managers 242, with local network managers maintaining open tunnels to one another.

Provider substrate extension locations can utilize software-defined networking and secure networking tunnels through the provider substrate extension 224 network to the cloud provider network 203, for example, to maintain security of customer data when traversing the provider substrate extension 224 network and any other intermediate network (which may include the public internet). Within the cloud provider network 203, these tunnels are composed of virtual infrastructure components including isolated virtual networks (e.g., in the overlay network), control plane proxies 245, data plane proxies 248, and substrate network interfaces. Such proxies 245, 248 may be implemented as containers running on compute instances. In some embodiments, each server in a provider substrate extension 224 location that hosts compute instances can utilize at least two tunnels: one for control plane traffic (e.g., Constrained Application Protocol (CoAP) traffic) and one for encapsulated data plane traffic. A connectivity manager (not shown) within the cloud provider network 203 manages the cloud provider network-side lifecycle of these tunnels and their components, for example, by provisioning them automatically when needed and maintaining them in a healthy operating state. In some embodiments, a direct connection between a provider substrate extension 224 location and the cloud provider network 203 can be used for control and data plane communications. As compared to a VPN through other networks, the direct connection can provide constant bandwidth and more consistent network performance because of its relatively fixed and stable network path.

A control plane (CP) proxy 245 can be provisioned in the cloud provider network 203 to represent particular host(s) in an edge location. CP proxies 245 are intermediaries between the control plane 218 in the cloud provider network 203 and control plane targets in the control plane 236 of provider substrate extension 224. That is, CP proxies 245 provide infrastructure for tunneling management API traffic destined for provider substrate extension servers out of the region substrate and to the provider substrate extension 224. For example, a virtualized computing service of the cloud provider network 203 can issue a command to a VMM of a server of a provider substrate extension 224 to launch a compute instance. A CP proxy 245 maintains a tunnel (e.g., a VPN) to a local network manager 242 of the provider substrate extension 224. The software implemented within the CP proxies 245 ensures that only well-formed API traffic leaves from and returns to the substrate. CP proxies 245 provide a mechanism to expose remote servers on the cloud provider substrate while still protecting substrate security materials (e.g., encryption keys, security tokens) from leaving the cloud provider network 203. The one-way control plane traffic tunnel imposed by the CP proxies 245 also prevents any (potentially compromised) devices from making calls back to the substrate. CP proxies 245 may be instantiated one-for-one with servers at a provider substrate extension 224 or may be able to manage control plane traffic for multiple servers in the same provider substrate extension.

A data plane (DP) proxy 248 can also be provisioned in the cloud provider network 203 to represent particular server(s) in a provider substrate extension 224. The DP proxy 248 acts as a shadow or anchor of the server(s) and can be used by services within the cloud provider network 203 to monitor the health of the host (including its availability, used/free compute and capacity, used/free storage and capacity, and network bandwidth usage/availability). The DP proxy 248 also allows isolated virtual networks to span provider substrate extensions 224 and the cloud provider network 203 by acting as a proxy for server(s) in the cloud provider network 203. Each DP proxy 248 can be implemented as a packet-forwarding compute instance or container. As illustrated, each DP proxy 248 can maintain a VPN tunnel with a local network manager 242 that manages traffic to the server(s) that the DP proxy 248 represents. This tunnel can be used to send data plane traffic between the provider substrate extension server(s) and the cloud provider network 203. Data plane traffic flowing between a provider substrate extension 224 and the cloud provider network 203 can be passed through DP proxies 248 associated with that provider substrate extension 224. For data plane traffic flowing from a provider substrate extension 224 to the cloud provider network 203, DP proxies 248 can receive encapsulated data plane traffic, validate it for correctness, and allow it to enter into the cloud provider network 203. DP proxies 248 can forward encapsulated traffic from the cloud provider network 203 directly to a provider substrate extension 224.

Local network manager(s) 242 can provide secure network connectivity with the proxies 245, 248 established in the cloud provider network 203. After connectivity has been established between the local network manager(s) 242 and the proxies 245, 248, customers may issue commands via the interface 206 to instantiate compute instances (and/or perform other operations using compute instances) using provider substrate extension resources in a manner analogous to the way in which such commands would be issued with respect to compute instances hosted within the cloud provider network 203. From the perspective of the customer, the customer can now seamlessly use local resources within a provider substrate extension 224 (as well as resources located in the cloud provider network 203, if desired). The compute instances set up on a server at a provider substrate extension 224 may communicate both with electronic devices located in the same network, as well as with other resources that are set up in the cloud provider network 203, as desired. A local gateway 251 can be implemented to provide network connectivity between a provider substrate extension 224 and a network associated with the extension.

There may be circumstances that necessitate the transfer of data between the object storage service and a provider substrate extension (PSE) 224. For example, the object storage service may store machine images used to launch VMs, as well as snapshots representing point-in-time backups of volumes. The object gateway can be provided on a PSE server or a specialized storage device, and provide customers with configurable, per-bucket caching of object storage bucket contents in their PSE 224 to minimize the impact of PSE-region latency on the customer's workloads. The object gateway can also temporarily store snapshot data from snapshots of volumes in the PSE 224 and then sync with the object servers in the region when possible. The object gateway can also store machine images that the customer designates for use within the PSE 224 or on the customer's premises. In some implementations, the data within the PSE 224 may be encrypted with a unique key, and the cloud provider can limit keys from being shared from the region to the PSE 224 for security reasons. Accordingly, data exchanged between the object store servers and the object gateway may utilize encryption, decryption, and/or re-encryption in order to preserve security boundaries with respect to encryption keys or other sensitive data. The transformation intermediary can perform these operations, and a PSE bucket can be created (on the object store servers) to store snapshot data and machine image data using the PSE encryption key.

In the manner described above, a PSE 224 forms an edge location, in that it provides the resources and services of the cloud provider network 203 outside of a traditional cloud provider data center and closer to customer devices. An edge location, as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as "far zones" (due to being far from other availability zones) or "near zones" (due to being near to customer workloads). A near zone may be connected in various ways to a publicly accessible network such as the Internet, for example directly, via another network, or via a private connection to a region. Although typically a near zone would have more limited capacity than a region, in some cases a near zone may have substantial capacity, for example thousands of racks or more.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-access edge computing (MEC) site having physical infrastructure spread across telecommunication data centers, telecommunication aggregation sites, and/or telecommunication base stations within the telecommunication network. In the on-premise example, the limited capacity of the outpost may be available for use only by the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone of the provider network. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

In the example of FIG. 1A, the distributed computing devices 112 (FIG. 1A), the centralized computing devices 115 (FIG. 1A), and the core computing devices 118 (FIG. 1A) may be implemented as provider substrate extensions 224 of the cloud provider network 203. The installation or siting of provider substrate extensions 224 within a communication network 100 can vary subject to the particular network topology or architecture of the communication network 100. Provider substrate extensions 224 can generally be connected anywhere the communication network 100 can break out packet-based traffic (e.g., IP based traffic). Additionally, communications between a given provider substrate extension 224 and the cloud provider network 203 typically securely transit at least a portion of the communication network 100 (e.g., via a secure tunnel, virtual private network, a direct connection, etc.).

In 5G wireless network development efforts, edge locations may be considered a possible implementation of Multi-access Edge Computing (MEC). Such edge locations can be connected to various points within a 5G network that provide a breakout for data traffic as part of the User Plane Function (UPF). Older wireless networks can incorporate edge locations as well. In 3G wireless networks, for example, edge locations can be connected to the packet-switched network portion of a communication network 100, such as to a Serving General Packet Radio Services Support Node (SGSN) or to a Gateway General Packet Radio Services Support Node (GGSN). In 4G wireless networks, edge locations can be connected to a Serving Gateway (SGW) or Packet Data Network Gateway (PGW) as part of the core network or evolved packet core (EPC). In some embodiments, traffic between a provider substrate extension 224 and the cloud provider network 203 can be broken out of the communication network 100 without routing through the core network.

In some embodiments, provider substrate extensions 224 can be connected to more than one communication network associated with respective customers. For example, when two communication networks of respective customers share or route traffic through a common point, a provider substrate extension 224 can be connected to both networks. For example, each customer can assign some portion of its network address space to the provider substrate extension 224, and the provider substrate extension 224 can include a router or gateway 251 that can distinguish traffic exchanged with each of the communication networks 100. For example, traffic destined for the provider substrate extension 224 from one network might have a different destination IP address, source IP address, and/or virtual local area network (VLAN) tag than traffic received from another network. Traffic originating from the provider substrate extension 224 to a destination on one of the networks can be similarly encapsulated to have the appropriate VLAN tag, source IP address (e.g., from the pool allocated to the provider substrate extension 224 from the destination network address space) and destination IP address.

Figure 2B:
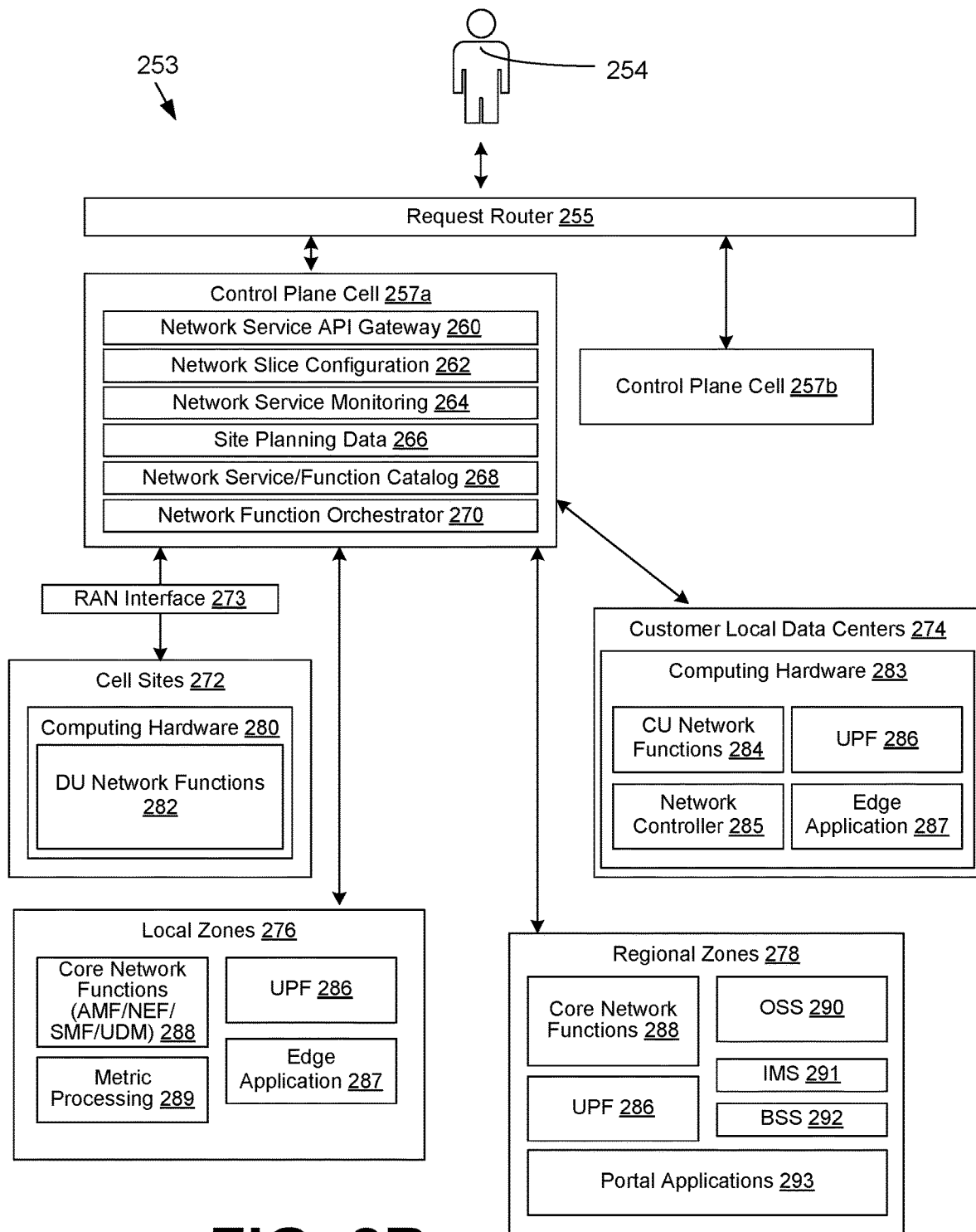
FIG. 2B depicts an example of cellularization and geographic distribution of the communication network of FIG. 1A, according to some embodiments of the present disclosure.

FIG. 2B depicts an example 253 of cellularization and geographic distribution of the communication network 100 (FIG. 1A) according to one or more embodiments. In FIG. 2B, a user device 254 communicates with a request router 255 to route a request to one of a plurality of control plane cells 257a and 257b. Each control plane cell 257 may include a network service API gateway 260, a network slice configuration 262, a function for network service monitoring 264, site planning data 266 (including layout, device type, device quantities, etc. that describe a customer's site requirements), a network service/function catalog 268, a function for orchestration 270, and/or other components. The larger control plane can be divided into cells in order to reduce the likelihood that large scale errors will affect a wide range of customers, for example by having one or more cells per customer, per network, or per region that operate independently.

The network service/function catalog 268 is also referred to as the NF Repository Function (NRF). In a Service Based Architecture (SBA) 5G network, the control plane functionality and common data repositories can be delivered by way of a set of interconnected network functions built using a microservices architecture. The NRF can maintain a record of available NF instantiations and their supported services, allowing other NF instantiations to subscribe and be notified of registrations from NF instantiations of a given type. The NRF thus can support service discovery by receipt of discovery requests from NF instantiations, and details which NF instantiations support specific services. The network function orchestrator 270 can perform NF lifecycle management including instantiation, scale-out/in, performance measurements, event correlation, and termination. The network function orchestrator 270 can also onboard new NFs, manage migration to new or updated versions of existing NFs, identify NF sets that are suitable for a particular network slice or larger network, and orchestrate NFs across different computing devices and sites that make up the radio-based network 103 (FIG. 1A).

The control plane cell 257 may be in communication with one or more cell sites 272 by way of a RAN interface 273, one or more customer local data centers 274, one or more local zones 276, and one or more regional zones 278. The RAN interface 273 may include an application programming interface (API) that facilitates provisioning or releasing capacity in a RAN operated by a third-party communication service provider at a cell site 272. The cell sites 272 include computing hardware 280 that executes one or more distributed unit (DU) network functions 282. The customer local data centers 274 include computing hardware 283 (e.g., a PSE 224) that execute one or more central unit (CU) network functions 284, a network controller 285, a UPF 286, one or more edge applications 287 corresponding to customer workloads, and/or other components.

The local zones 276, which may be in a data center operated by a cloud service provider, may execute one or more core network functions 288, such as an AMF, an SMF, a network exposure function (NEF) that securely exposes the services and capabilities of other network functions, a unified data management (UDM) function that manages subscriber data for authorization, registration, and mobility management. The local zones 276 may also execute a UPF 286, a service for metric processing 289, and one or more edge applications 287. In some implementations, such core network functions may be run on a PSE 224 which is more local to the PSE 224 running the DU/CU network functions 284, for example the same PSE 224 or another PSE 224 collocated at the same facility.

The regional zones 278, which may be in a data center operated by a cloud service provider, may execute one or more core network functions 288; a UPF 286; an operations support system (OSS) 290 that supports network management systems, service delivery, service fulfillment, service assurance, and customer care; an internet protocol multimedia subsystem (IMS) 291; a business support system (BSS) 292 that supports product management, customer management, revenue management, and/or order management; one or more portal applications 293, and/or other components.

In this example, the communication network 100 employs a cellular architecture to reduce the blast radius of individual components. At the top level, the control plane is in multiple control plane cells 257 to prevent an individual control plane failure from impacting all deployments.

Within each control plane cell 257, multiple redundant stacks can be provided with the control plane shifting traffic to secondary stacks as needed. For example, a cell site 272 may be configured to utilize a nearby local zone 276 as its default core network. In the event that the local zone 276 experiences an outage, the control plane can redirect the cell site 272 to use the backup stack in the regional zone 278. Traffic that would normally be routed from the internet to the local zone 276 can be shifted to endpoints for the regional zones 278. Each control plane cell 257 can implement a "stateless" architecture that shares a common session database across multiple sites (such as across availability zones or edge sites).

Figure 3:
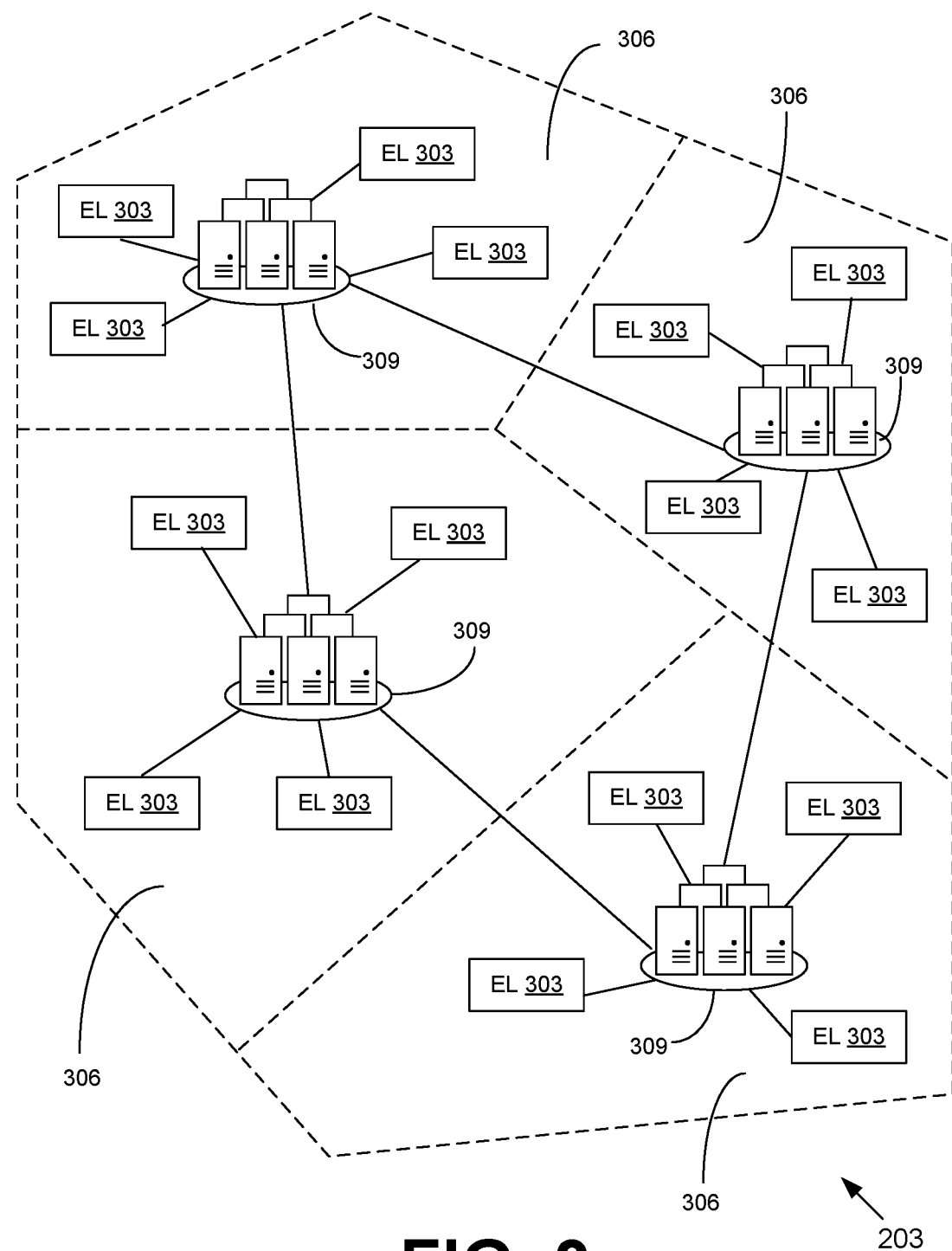
FIG. 3 illustrates an example of the networked environment of FIG. 2A including geographically dispersed provider substrate extensions according to some embodiments of the present disclosure.

FIG. 3 illustrates an exemplary cloud provider network 203 including geographically dispersed provider substrate extensions 224 (FIG. 2A) (or "edge locations 303") according to some embodiments. As illustrated, a cloud provider network 203 can be formed as a number of regions 306, where a region 306 is a separate geographical area in which the cloud provider has one or more data centers 309. In some embodiments, the cloud provider network 203 may implement a software-defined network such as a virtual local area network or a virtual private cloud network on top of a physical communications network. Consequently, using software-defined networking, two physically distinct network segments may be combined into a single virtual network segment. Likewise, a subset of hosts on a physical network segment may be separated to different virtual network segment than other hosts on the physical network segment. In some cases, hosts may be on multiple virtual network segments simultaneously.

Each region 306 can include two or more availability zones (AZs) connected to one another via a private high-speed network such as, for example, a fiber communication connection. An availability zone refers to an isolated failure domain including one or more data center facilities with separate power, separate networking, and separate cooling relative to other availability zones. A cloud provider may strive to position availability zones within a region 306 far enough away from one another such that a natural disaster, widespread power outage, or other unexpected event does not take more than one availability zone offline at the same time. Customers can connect to resources within availability zones of the cloud provider network 203 via a publicly accessible network (e.g., the Internet, a cellular communication network, a communication service provider network). Transit Centers (TC) are the primary backbone locations linking customers to the cloud provider network 203 and may be co-located at other network provider facilities (e.g., Internet service providers, telecommunications providers). Each region 306 can operate two or more TCs for redundancy. Regions 306 are connected to a global network which includes private networking infrastructure (e.g., fiber connections controlled by the cloud service provider) connecting each region 306 to at least one other region. The cloud provider network 203 may deliver content from points of presence (PoPs) outside of, but networked with, these regions 306 by way of edge locations 303 and regional edge cache servers. This compartmentalization and geographic distribution of computing hardware enables the cloud provider network 203 to provide low-latency resource access to customers on a global scale with a high degree of fault tolerance and stability.

In comparison to the number of regional data centers or availability zones, the number of edge locations 303 can be much higher. Such widespread deployment of edge locations 303 can provide low-latency connectivity to the cloud for a much larger group of end user devices (in comparison to those that happen to be very close to a regional data center). In some embodiments, each edge location 303 can be peered to some portion of the cloud provider network 203 (e.g., a parent availability zone or regional data center). Such peering allows the various components operating in the cloud provider network 203 to manage the compute resources of the edge location 303. In some cases, multiple edge locations 303 may be sited or installed in the same facility (e.g., separate racks of computer systems) and managed by different zones or data centers 309 to provide additional redundancy. Note that although edge locations 303 are typically depicted herein as within a communication service provider network or a radio-based network 103 (FIG. 1A), in some cases, such as when a cloud provider network facility is relatively close to a communications service provider facility, the edge location 303 can remain within the physical premises of the cloud provider network 203 while being connected to the communications service provider network via a fiber or other network link.

An edge location 303 can be structured in several ways. In some implementations, an edge location 303 can be an extension of the cloud provider network substrate including a limited quantity of capacity provided outside of an availability zone (e.g., in a small data center 309 or other facility of the cloud provider that is located close to a customer workload and that may be distant from any availability zones). Such edge locations 303 may be referred to as local zones (due to being more local or proximate to a group of users than traditional availability zones). A local zone may be connected in various ways to a publicly accessible network such as the Internet, for example directly, via another network, or via a private connection to a region 306. Although typically a local zone would have more limited capacity than a region 306, in some cases a local zone may have substantial capacity, for example thousands of racks or more. Some local zones may use similar infrastructure as typical cloud provider data centers, instead of the edge location 303 infrastructure described herein.

As indicated herein, a cloud provider network 203 can be formed as a number of regions 306, where each region 306 represents a geographical area in which the cloud provider clusters data centers 309. Each region 306 can further include multiple (e.g., two or more) availability zones (AZs) connected to one another via a private high-speed network, for example, a fiber communication connection. An AZ may provide an isolated failure domain including one or more data center facilities with separate power, separate networking, and separate cooling from those in another AZ. Preferably, AZs within a region 306 are positioned far enough away from one another such that a same natural disaster (or other failure-inducing event) should not affect or take more than one AZ offline at the same time. Customers can connect to an AZ of the cloud provider network 203 via a publicly accessible network (e.g., the Internet, a cellular communication network).

The parenting of a given edge location 303 to an AZ or region 306 of the cloud provider network 203 can be based on a number of factors. One such parenting factor is data sovereignty. For example, to keep data originating from a communication network in one country within that country, the edge locations 303 deployed within that communication network can be parented to AZs or regions 306 within that country. Another factor is availability of services. For example, some edge locations 303 may have different hardware configurations such as the presence or absence of components such as local non-volatile storage for customer data (e.g., solid state drives), graphics accelerators, etc. Some AZs or regions 306 might lack the services to exploit those additional resources, thus, an edge location could be parented to an AZ or region 306 that supports the use of those resources. Another factor is the latency between the AZ or region 306 and the edge location 303. While the deployment of edge locations 303 within a communication network has latency benefits, those benefits might be negated by parenting an edge location 303 to a distant AZ or region 306 that introduces significant latency for the edge location 303 to region traffic. Accordingly, edge locations 303 are often parented to nearby (in terms of network latency) AZs or regions 306.

Figure 4:
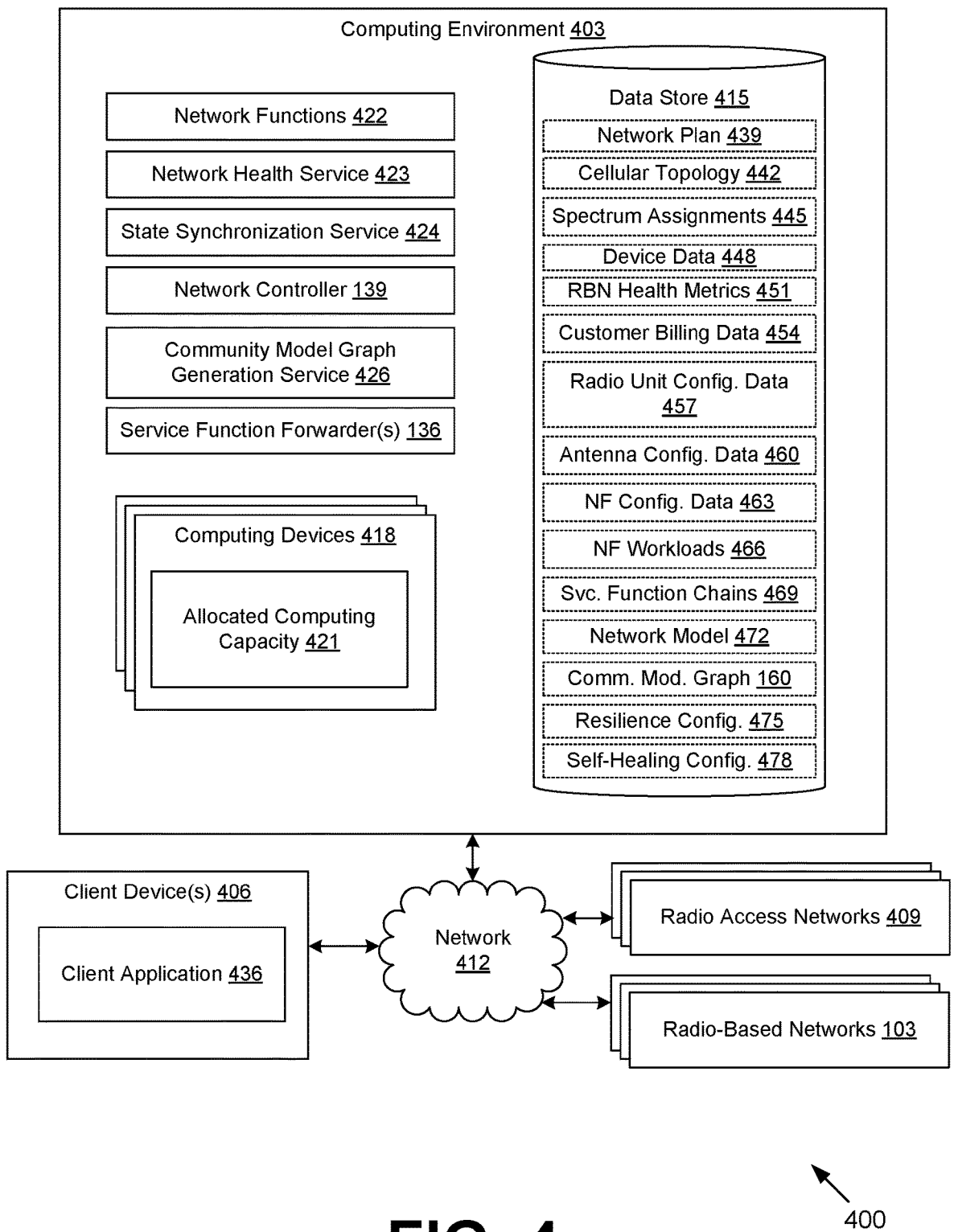
FIG. 4 is a schematic block diagram of the networked environment of FIG. 2A according to various embodiments of the present disclosure.

With reference to FIG. 4, shown is a networked environment 400 according to various embodiments. The networked environment 400 includes a computing environment 403, one or more client devices 406, one or more radio access networks (RANs) 409, and one or more radio-based networks 103, which are in data communication with each other via a network 412. The network 412 includes, for example, the Internet, intranets, extranets, wide area networks (WANs), local area networks (LANs), wired networks, wireless networks, cable networks, satellite networks, or other suitable networks, etc., or any combination of two or more such networks. The RANs 409 may be operated by a plurality of different communication service providers. In some cases, one or more of the RANs 409 may be operated by a cloud provider network 203 (FIG. 2A) or a customer of the cloud provider network 203.

The computing environment 403 may comprise, for example, a server computer or any other system providing computing capacity. Alternatively, the computing environment 403 may employ a plurality of computing devices that may be arranged, for example, in one or more server banks or computer banks or other arrangements. Such computing devices may be located in a single installation or may be distributed among many different geographical locations. For example, the computing environment 403 may include a plurality of computing devices that together may comprise a hosted computing resource, a grid computing resource, and/or any other distributed computing arrangement. In some cases, the computing environment 403 may correspond to an elastic computing resource where the allotted capacity of processing, network, storage, or other computing-related resources may vary over time. For example, the computing environment 403 may correspond to a cloud provider network 203, where customers are billed according to their computing resource usage based on a utility computing model.

In some embodiments, the computing environment 403 may correspond to a virtualized private network within a physical network comprising virtual machine instances executed on physical computing hardware, e.g., by way of a hypervisor. The virtual machine instances and any containers running on these instances may be given network connectivity by way of virtualized network components enabled by physical network components, such as routers and switches.

Various applications and/or other functionality may be executed in the computing environment 403 according to various embodiments. Also, various data is stored in a data store 415 that is accessible to the computing environment 403. The data store 415 may be representative of a plurality of data stores 415 as can be appreciated. The data stored in the data store 415, for example, is associated with the operation of the various applications and/or functional entities described below.

The computing environment 403 as part of a cloud provider network offering utility computing services includes computing devices 418 and other types of computing devices. The computing devices 418 may correspond to different types of computing devices 418 and may have different computing architectures. The computing architectures may differ by utilizing processors having different architectures, such as x86, x86_64, ARM, Scalable Processor Architecture (SPARC), PowerPC, and so on. For example, some computing devices 418 may have x86 processors, while other computing devices 418 may have ARM processors. The computing devices 418 may differ also in hardware resources available, such as local storage, graphics processing units (GPUs), machine learning extensions, and other characteristics.

The computing devices 418 may have various forms of allocated computing capacity 421, which may include virtual machine (VM) instances, containers, serverless functions, and so forth. The VM instances may be instantiated from a VM image. To this end, customers may specify that a virtual machine instance should be launched in a particular type of computing device 418 as opposed to other types of computing devices 418. In various examples, one VM instance may be executed singularly on a particular computing device 418, or a plurality of VM instances may be executed on a particular computing device 418. Also, a particular computing device 418 may execute different types of VM instances, which may offer different quantities of resources available via the computing device 418. For example, some types of VM instances may offer more memory and processing capability than other types of VM instances.

The components executed on the computing environment 403, for example, include one or more network functions 422, a network health service 423, a state synchronization service 424, a network controller 139, a community model graph generation service 426, one or more service function forwarders 136, and other applications, services, processes, systems, engines, or functionality not discussed in detail herein.

The network functions 422 may correspond to various service functions implemented in a radio-based network 103, such as a 4G, 5G, or 6G network. In various examples, the network functions 422 may include one or more DU network functions 282 (FIG. 2B), one or more CU network functions 284 (FIG. 2B), one or more core network functions 288 (FIG. 2B) such as one or more UPFs 286 (FIG. 2B), and so on. In various embodiments, the network functions 422 themselves, or an environment in which they are executed, may be NSH-aware, such that the network functions 422 can decapsulate overlay network traffic that includes NSHs received from a service function forwarder 136 and add NSHs to encapsulate overlay network traffic before sending the network traffic to a service function forwarder 136.

The network health service 423 may be executed to monitor the health and performance of the radio-based network 103. This may include receiving and analyzing metrics related to network links, networking components, and network functions 422. As such, the network health service 423 may be able to detect overload conditions and predict failures or service degradations. The network health service 423 may also detect when a network function 422 has become unresponsive, e.g., due to a failure of the network function 422 to respond to a health status check from the network health service 423, or when the network function 422 has failed to transmit an expected periodic health status update to the network health service 423. In some embodiments, the network health service 423 may utilize a hierarchy of health monitoring agents deployed in various components of the radio-based network 103, which may collect and aggregate health information for further processing by the network health service 423. In one implementation, the network health service 423 may utilize simple network management protocol (SNMP) to collect information from various components of the radio-based network 103. Ultimately, as a result of processing the collected health information, the network health service 423 may generate adverse health events for reporting to the network controller 139.

The state synchronization service 424 is executed to maintain synchronization of network function state in a radio-based network 103. In this way, the state synchronization service 424 may exchange state synchronization messages with various RAN-enabled edge servers in a radio-based network 103, aggregate the messages, and develop a canonical copy of the DU state, CU state, and/or core state. Corresponding state synchronization agents may also be executed on the RAN-enabled edge servers to facilitate synchronization. In some cases, a centralized state synchronization service 424 is absent and replaced with the state synchronization agents on the RAN-enabled edge servers. By synchronizing or replicating network function state, a particular instantiation of a network function 422 can be swapped out for another instantiation of the network function 422 and/or stateful load balancing may be implemented.

The network controller 139 may be executed to manage a radio-based network 103. In various embodiments, the network controller 139 may manage self-healing activities and resilience-building activities. The network controller 139 may also manage service function chaining and initiate modifications as appropriate to service function chains, e.g., to implement load balancing or service restoration activities.

The community model graph generation service 426 is executed to generate one or more community model graphs 160 (FIG. 1D) for a radio-based network 103. For example, the community model graph generation service 426 may utilize a community identifying algorithm, such as the Girvan-Newman algorithm or another clustering algorithm, to identify a plurality of logical communities 169 (FIG. 1D), for the purpose of identifying relative importance and priority for individual network connections in the radio-based network 103.

The service function forwarders 136 are configured to route and forward network traffic (e.g., control plane network traffic) between a source (e.g., a client device 106 (FIG. 1B) or a radio unit 133 (FIG. 1B)) and other network functions 422 in a radio-based network 103. The operation of the service function forwarders 136 is configured to implement one or more service function chains, or chains of network functions 422 that are to process the network traffic. The service function forwarders 136 may determine a next-hop network function 422 based at least in part on a network service header added to the network traffic through encapsulation (e.g., by the classifier 134 (FIG. 1B)).

The data stored in the data store 415 includes, for example, one or more network plans 439, one or more cellular topologies 442, one or more spectrum assignments 445, device data 448, one or more RBN health metrics 451, customer billing data 454, radio unit configuration data 457, antenna configuration data 460, network function configuration data 463, one or more network function workloads 466, one or more service function chains 469, one or more network models 472, one or more community model graphs 160, resilience configuration 475, self-healing configuration 478, and potentially other data.

The network plan 439 is a specification of a radio-based network 103 to be deployed for a customer. For example, a network plan 439 may include premises locations or geographic areas to be covered, a number of cells, device identification information and permissions, a desired maximum network latency, a desired bandwidth or network throughput for one or more classes of devices, one or more quality of service parameters for applications or services, one or more routes to be covered by the RBN 103, a schedule of coverage for the RBN 103 or for portions of the RBN 103, a periodic schedule of coverage for the RBN 103 or for portions of the RBN 103, a start time for the RBN 103 or for portions of the RBN 103, an end time for the RBN 103 or for portions of the RBN 103, and/or other parameters that can be used to create a radio-based network 103. A customer may manually specify one or more of these parameters via a user interface. One or more of the parameters may be prepopulated as default parameters. In some cases, a network plan 439 may be generated for a customer based at least in part on automated site surveys using unmanned aerial vehicles. Values of the parameters that define the network plan 439 may be used as a basis for a cloud service provider billing the customer under a utility computing model. For example, the customer may be billed a higher amount for lower latency targets and/or higher bandwidth targets in a service-level agreement (SLA), and the customer can be charged on a per-device basis, a per-cell basis, based on a geographic area served, based on spectrum availability, etc. In some cases, the network plan 439 may incorporate thresholds and reference parameters determined at least in part on an automated probe of an existing private network of a customer.

The cellular topology 442 includes an arrangement of a plurality of cells for a customer that takes into account reuse of frequency spectrum where possible given the location of the cells. The cellular topology 442 may be automatically generated given a site survey. In some cases, the number of cells in the cellular topology 442 may be automatically determined based on a desired geographic area to be covered, availability of backhaul connectivity at various sites, signal propagation, available frequency spectrum, and/or on other parameters. For radio-based networks 103, the cellular topology 442 may be developed to cover one or more buildings in an organizational campus, one or more schools in a school district, one or more buildings in a university or university system, and other areas.

The spectrum assignments 445 include frequency spectrum that is available to be allocated for radio-based networks 103 as well as frequency spectrum that is currently allocated to radio-based networks 103. The frequency spectrum may include spectrum that is publicly accessible without restriction, spectrum that is individually owned or leased by customers, spectrum that is owned or leased by the provider, spectrum that is free to use but requires reservation, and so on.

The device data 448 corresponds to data describing wireless devices 106 that are permitted to connect to the radio-based network 103. This device data 448 includes corresponding users, account information, billing information, data plans, permitted applications or uses, an indication of whether the wireless device 106 is mobile or fixed, a location, a current cell, a network address, device identifiers (e.g., International Mobile Equipment Identity (IMEI) number, Equipment Serial Number (ESN), Media Access Control (MAC) address, Subscriber Identity Module (SIM) number, etc.), and so on.

The RBN health metrics 451 include various metrics or statistics that indicate the performance or health of the radio-based network 103. Such RBN health metrics 451 may include bandwidth metrics, dropped packet metrics, signal strength metrics, latency metrics, and so on. The RBN health metrics 451 may be aggregated on a per-device basis, a per-cell basis, a per-customer basis, etc.

The customer billing data 454 specifies charges that the customer is to incur for the operation of the radio-based network 103 for the customer by the provider. The charges may include fixed costs based upon equipment deployed to the customer and/or usage costs based upon utilization as determined by usage metrics that are tracked. In some cases, the customer may purchase the equipment up-front and may be charged only for bandwidth or backend network costs. In other cases, the customer may incur no up-front costs and may be charged purely based on utilization. With the equipment being provided to the customer based on a utility computing model, the cloud service provider may choose an optimal configuration of equipment in order to meet customer target performance metrics while avoiding overprovisioning of unnecessary hardware.

The radio unit configuration data 457 may correspond to configuration settings for radio units deployed in radio-based networks 103. Such settings may include frequencies to be used, protocols to be used, modulation parameters, bandwidth, network routing and/or backhaul configuration, and so on.

The antenna configuration data 460 may correspond to configuration settings for antennas, to include frequencies to be used, azimuth, vertical or horizontal orientation, beam tilt, and/or other parameters that may be controlled automatically (e.g., by network-connected motors and controls on the antennas) or manually by directing a user to mount the antenna in a certain way or make a physical change to the antenna.

The network function configuration data 463 corresponds to configuration settings that configure the operation of various network functions 422 for the radio-based network 103. In various embodiments, the network functions 422 may be deployed in VM instances or containers located in computing devices 418 that are at cell sites, at customer aggregation sites, or in data centers remotely located from the customer. Non-limiting examples of network functions 422 may include an access and mobility management function, a session management function, a user plane function, a policy control function, an authentication server function, a unified data management function, an application function, a network exposure function, a network function repository, a network slice selection function, and/or others. The network function workloads 466 correspond to machine images, containers, or functions to be launched in the allocated computing capacity 421 to perform one or more of the network functions 422.

The service function chains 469 correspond to an ordered sequence of network functions 422 that are to process network traffic (e.g., control plane traffic and/or data plane traffic) for a particular source (e.g., a client device 106 or a radio unit 133). The service function chains 469 may be implemented by the network controller 139 configuring one or more service function forwarders 136 to forward traffic associated with particular service function chains 469 to a next destination in the service function chain 469.

The network model 472 may correspond to a representation of the radio-based network 103 and its constituent network functions 422 and other components. For example, the network model 472 may be generated based at least in part on the network plan 439. The community model graph 160 corresponds to a graph representing the network model 472 which is generated by a community identifying algorithm implemented by the community model graph generation service 426.

The resilience configuration 475 may include a ruleset, settings, and parameters that configure the network controller 139 in determining whether to take an action to build resilience in the radio-based network 103, and what action(s) should be taken. For example, the resilience configuration 475 may set forth threshold values for measures of relative importance for identifying connections that should be upgraded or load balanced. The self-healing configuration 478 may include a ruleset, settings, and parameters that configure the network controller 139 in determining what action(s) should be taken in response to an adverse health event generated by the network health service 423 to effect self-healing in the radio-based network 103. For example, the self-healing configuration 478 may identify thresholds for RBN health metrics 451 and/or listings of particular types of adverse health events that are associated with one or more self-healing actions.

The client device 406 is representative of a plurality of client devices 406 that may be coupled to the network 412. The client device 406 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 406 may include a display comprising, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 406 may be configured to execute various applications such as a client application 436 and/or other applications. The client application 436 may be executed in a client device 406, for example, to access network content served up by the computing environment 403 and/or other servers, thereby rendering a user interface on the display. To this end, the client application 436 may comprise, for example, a browser, a dedicated application, etc., and the user interface may comprise a network page, an application screen, etc. The client device 406 may be configured to execute applications beyond the client application 436 such as, for example, email applications, social networking applications, word processors, spreadsheets, and/or other applications.

Figure 5:
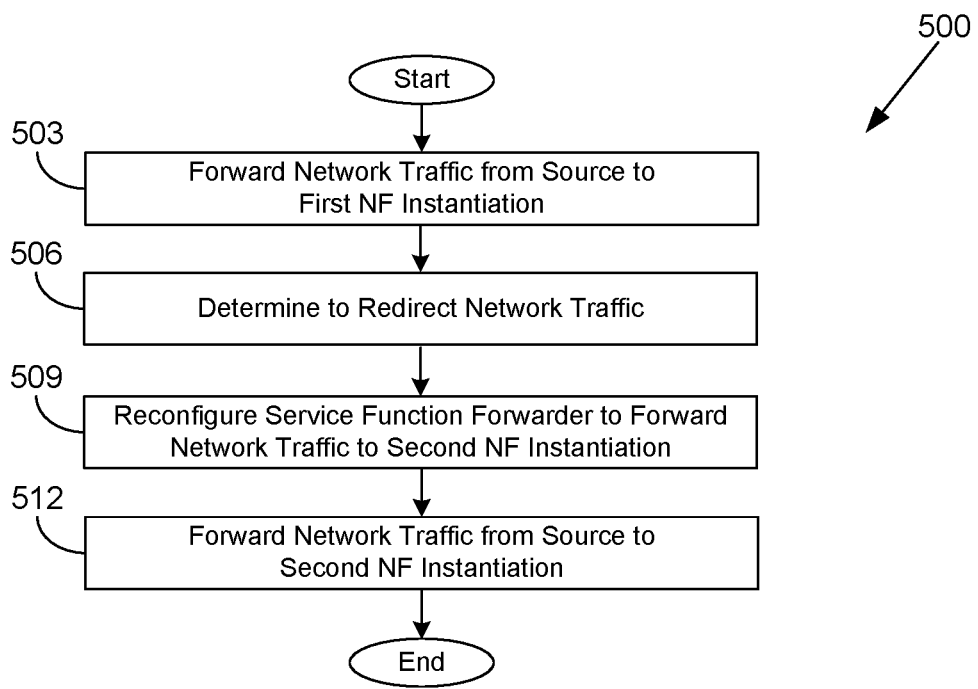
FIG. 5 is a flowchart illustrating an example of functionality implemented as portions of a radio-based network using service function chaining in the networked environment of FIG. 4 according to various embodiments of the present disclosure.

Referring next to FIG. 5, shown is a flowchart 500 that provides one example of the operation of a portion of the radio-based network 103 (FIG. 1A) using service function chaining according to various embodiments. It is understood that the flowchart 500 provides merely an example of the many different types of functional arrangements that may be employed to implement the operation of the portion of the radio-based network 103 as described herein. As an alternative, the flowchart 500 may be viewed as depicting an example of elements of a method implemented in the computing environment 403 (FIG. 4) according to one or more embodiments.

Beginning with box 503, a service function forwarder 136 (FIG. 4) in a radio-based network 103 forwards network traffic (e.g., control plane network traffic and/or data plane network traffic) from a source (e.g., a client device 106 (FIG. 1A), a radio unit 133 (FIG. 1B), or a particular network function 422 (FIG. 4)) to a first instantiation of a network function 422. For example, the network function 422 may correspond to a function of a distributed unit (DU) 142 (FIG. 1B) in a radio access network, a centralized unit (CU) 145 (FIG. 1B) in a radio access network, or a core network 148 (FIG. 1B) in a cloud provider network 203 (FIG. 2A).

The radio-based network 103, the radio access network, and the cloud provider network 203 may implement a software-defined network such as a virtual local area network or a virtual private cloud network on top of a physical communications network, and the service function forwarder 136 may be said to implement an overlay on top of the software-defined network. The service function forwarder 136 forwards the network traffic according to a service function chain 469 (FIG. 4) that defines an ordered sequence of network functions 422 in the radio-based network 103 that are to process the network traffic. In forwarding the network traffic, the service function forwarder 136 may tunnel or encapsulate the network traffic by at least adding a network service header (NSH) to individual packets in the network traffic, and the receiving network function 422 and/or one or more intermediate network devices may be NSH-aware to decapsulate and process the network traffic correctly. In other examples, the encapsulation may be performed by a classifier 134 (FIG. 1B).

In box 506, a network controller 139 determines to redirect the network traffic for the service function chain 469 to a second instantiation of the network function 422 instead of the first instantiation of the network function 422. For example, the network controller 139 may determine to replace the first instantiation of the network function 422 with the second instantiation of the network function 422 because the first instantiation is overloaded and should be load balanced, is unhealthy and associated with adverse health information, has failed, or otherwise is associated with a service health event. In some embodiments, the controller 139 may implement the functionality of a load balancer, or a separate load balancer element may be used in order to determine whether to load balance among multiple instantiations of a network function 422. In other examples, a network administrator may initiate a replacement of the first instantiation via the client application 436 through one or more user interfaces associated with the network controller 139.

In box 509, the network controller 139 reconfigures the service function forwarder 136 to forward the network traffic to the second instantiation of the network function 422 instead of the first instantiation of the network function 422. The network controller 139 may cause the processing state information for the network traffic flow to be transferred from the first instantiation of the network function 422 to the second instantiation of the network function 422, e.g., by operation of the state synchronization service 424 (FIG. 4).

In box 512, the service function forwarder 136 forwards network traffic from the source to the second instantiation of the network function 422, as configured by the service function chain 469. In some examples, the service function forwarder 136 may communicate with the first instantiation of the network function 422 via the same virtual network link as the service function forwarder 136 communicates with the second instantiation of the network function 422. However, in some examples, the network traffic may traverse different underlying physical network links to reach the different instantiations of the network function 422, although the network traffic may appear to be routed using the same virtual network link. Thereafter, the flowchart 500 ends.

Figure 6A:
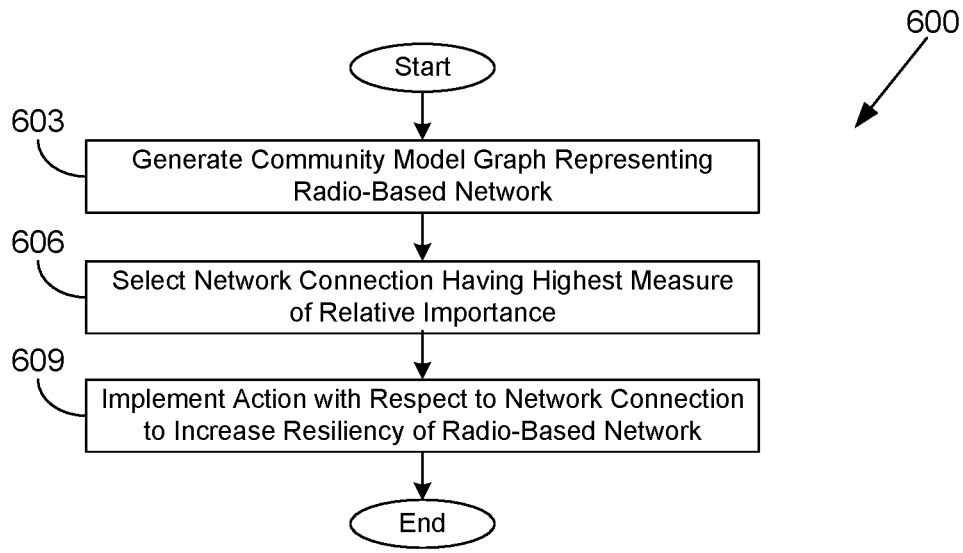
FIG. 6A is a flowchart illustrating an example of functionality implemented as portions of a radio-based network using a community model to increase resiliency in the networked environment of FIG. 4 according to various embodiments of the present disclosure.

Moving now to FIG. 6A, shown is a flowchart 600 that provides one example of the operation of a portion of the radio-based network 103 (FIG. 1A) using a community model to increase resiliency according to various embodiments. It is understood that the flowchart 600 provides merely an example of the many different types of functional arrangements that may be employed to implement the operation of the portion of the radio-based network 103 as described herein. As an alternative, the flowchart 600 may be viewed as depicting an example of elements of a method implemented in the computing environment 403 (FIG. 4) according to one or more embodiments.

Beginning with box 603, the community model graph generation service 426 (FIG. 4) generates a community model graph 160 (FIG. 4) for a radio-based network 103 based at least in part on a network model 472 of the radio-based network 103. For example, a community-identifying algorithm such as the Girvan-Newman algorithm may be applied to the network model 472. Individual nodes 163 (FIG. 1D) of the community model graph 160 may be assigned to logical communities 169 (FIG. 1C) encompassing one or more network functions 422 (FIG. 4) of the radio-based network 103.

Individual edges 166 (FIG. 1D) of the community model graph 160 correspond to a respective network connection between the network functions 422. The individual edges 166 may be assigned a respective measure of relative importance with respect to linking the identified logical communities 169. The respective measure of relative importance may correspond to an edge betweenness value. Network connections within logical communities 169 may have a lower measure of relative importance as compared to network connections between logical communities 169, as the connections between logical communities 169 may be of greater significance in operating the radio-based network 103. The network connection corresponding to the edge 166 may correspond, for example, to a single virtual network connection and/or multiple underlying physical data links.

In box 606, the network controller 139 (FIG. 4) selects a particular network connection that has a highest measure of relative importance, or edge betweenness value, in the community model graph 160. For example, the particular network connection may connect a radio access network (RAN)-enabled edge server at a cell site 272 (FIG. 2B), such as a provider substrate extension 224 (FIG. 2A) implementing the function of the distributed computing devices 112 (FIG. 1A) and/or the centralized computing devices 115 (FIG. 1A), with a portion of a cloud provider network 203 (FIG. 2A), such as a local zone 276 (FIG. 2B) or a regional zone 278 (FIG. 2B). In another example, the particular network connection may be between one or more core network functions 288 (FIG. 2B).

In box 609, the network controller 139, according to rules and thresholds established in the resilience configuration 475 (FIG. 4), implements one or more actions with respect to the particular network connection to increase resiliency of the radio-based network 103. The actions may be based at least in part on RBN health metrics 451 (FIG. 4) and/or other health information reported by the network health service 423 (FIG. 4).

In one example, the network controller 139 may modify a service function chain 469 (FIG. 4) for a service function forwarder 136 (FIG. 4) to route at least a portion of network traffic from a source (e.g., a radio unit 133 (FIG. 1B) or a client device 106 (FIG. 1A)) to a first network function 422 (FIG. 4) instead of a second network function 422 associated with the particular network connection. This may also shift network traffic to a different network connection. This transfer of network traffic may implement load balancing so that the first network function 422 is not overloaded. In some cases, the network controller 139 may initiate deployment of additional instantiations of a network function 422 for resiliency purposes, and the service function chain 469 may be modified to send a portion of traffic to the additional instantiations.

In another example, the network controller 139 may initiate a bandwidth upgrade for one or more data links underlying the particular network connection. In another example, the network controller 139 may initiate a deployment of an additional network connection to supplement the particular network connection, thereby providing additional capacity to support resiliency. Thereafter, the flowchart 600 ends.

Figure 6B:
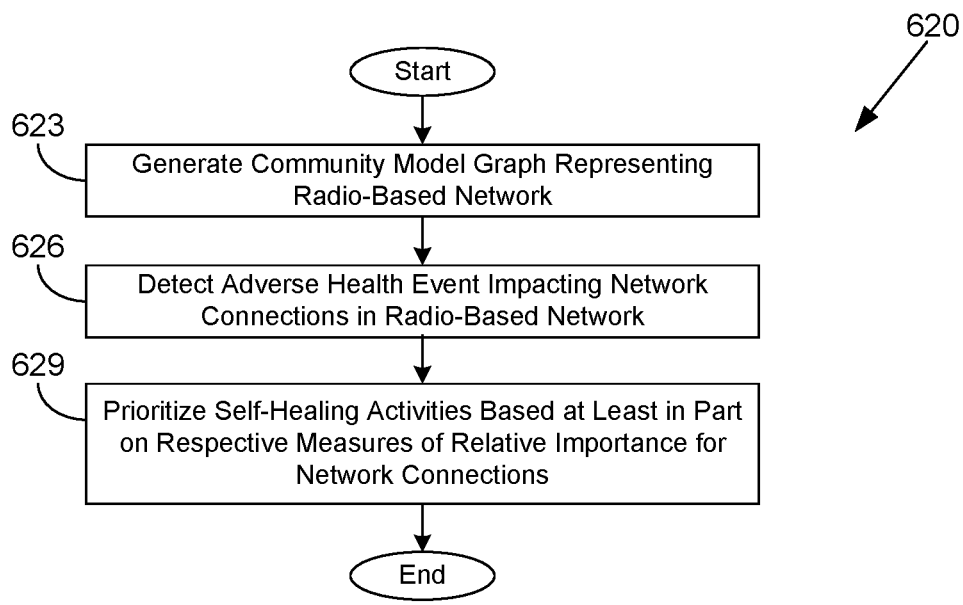
FIG. 6B is a flowchart illustrating an example of functionality implemented as portions of a radio-based network using a community model to perform prioritized self-healing in the networked environment of FIG. 4 according to various embodiments of the present disclosure.

Turning next to FIG. 6B, shown is a flowchart 620 that provides one example of the operation of a portion of the radio-based network 103 (FIG. 1A) using a community model to perform prioritized self-healing according to various embodiments. It is understood that the flowchart 620 provides merely an example of the many different types of functional arrangements that may be employed to implement the operation of the portion of the radio-based network 103 as described herein. As an alternative, the flowchart 620 may be viewed as depicting an example of elements of a method implemented in the computing environment 403 (FIG. 4) according to one or more embodiments.

Beginning with box 623, the community model graph generation service 426 (FIG. 4) generates a community model graph 160 (FIG. 4) for a radio-based network 103 based at least in part on a network model 472 of the radio-based network 103. For example, a community-identifying algorithm such as the Girvan-Newman algorithm may be applied to the network model 472. Individual nodes 163 (FIG. 1D) of the community model graph 160 may be assigned to logical communities 169 (FIG. 1C) encompassing one or more network functions 422 (FIG. 4) of the radio-based network 103.

Individual edges 166 (FIG. 1D) of the community model graph 160 correspond to a respective network connection between the network functions 422. The individual edges 166 may be assigned a respective measure of relative importance with respect to linking the identified logical communities 169. The respective measure of relative importance may correspond to an edge betweenness value. Network connections within logical communities 169 may have a lower measure of relative importance as compared to network connections between logical communities 169, as the connections between logical communities 169 may be of greater significance in operating the radio-based network 103. The network connection corresponding to the edge 166 may correspond, for example, to a single virtual network connection and/or multiple underlying physical data links.

In box 626, the network controller 139 (FIG. 4) detects an adverse health event via the network health service 423 (FIG. 4) or by processing health information such as the RBN health metrics 451 (FIG. 4). The adverse health event may impact a plurality of network connections in the radio-based network 103. For example, a device misconfiguration may cause multiple network connections to go offline. In various examples, the adverse health event may correspond to a failure of networking hardware, a failure of a physical data link, an overutilization of a networking component shared at least in part by the plurality of network connections, and so forth.

In box 629, the network controller 139, according to the rules and thresholds established in the self-healing configuration 478 (FIG. 4), prioritizes self-healing activities based at least in part on respective measures of relative importance, or edge betweenness values, corresponding to the network connections. In this way, more important connections (e.g., those which are between logical communities 169 (FIG. 1D) as opposed to those which are within logical communities 169 may be prioritized for service restoration and/or other activities. If a first network connection is determined to have a higher measure of relative importance in the community model graph 160 than a second network connection, then a remedial action to address the adverse health event with respect to the first network connection may be initiated before a remedial action to address the adverse health event with respect to the second network connection.

For example, a prioritized one of the network connections may connect a radio access network (RAN)-enabled edge server at a cell site 272 (FIG. 2B), such as a provider substrate extension 224 (FIG. 2A) implementing the function of the distributed computing devices 112 (FIG. 1A) and/or the centralized computing devices 115 (FIG. 1A), with a portion of a cloud provider network 203 (FIG. 2A), such as a local zone 276 (FIG. 2B) or a regional zone 278 (FIG. 2B). In another example, a prioritized one of the network connections may be between one or more core network functions 288 (FIG. 2B). The prioritization may be employed for manual restoration activities as well as automated self-healing activities controlled by the network controller 139. For example, the self-healing activities may include redirecting network traffic to different network functions 422 by modifying a service function chain 469 (FIG. 4) to configure a service function forwarder 136 (FIG. 4). The different network functions 422 may be selected based at least in part upon nearness on the network as approximated by detected latency. The self-healing activities may include identifying a different network connection that is not impacted by the adverse health event based at least in part on the respective measure of relative importance of the different network connection, and then redirecting network traffic from a particular network function 422 to the different network connection. Thereafter, the flowchart 620 ends.

Figure 7:
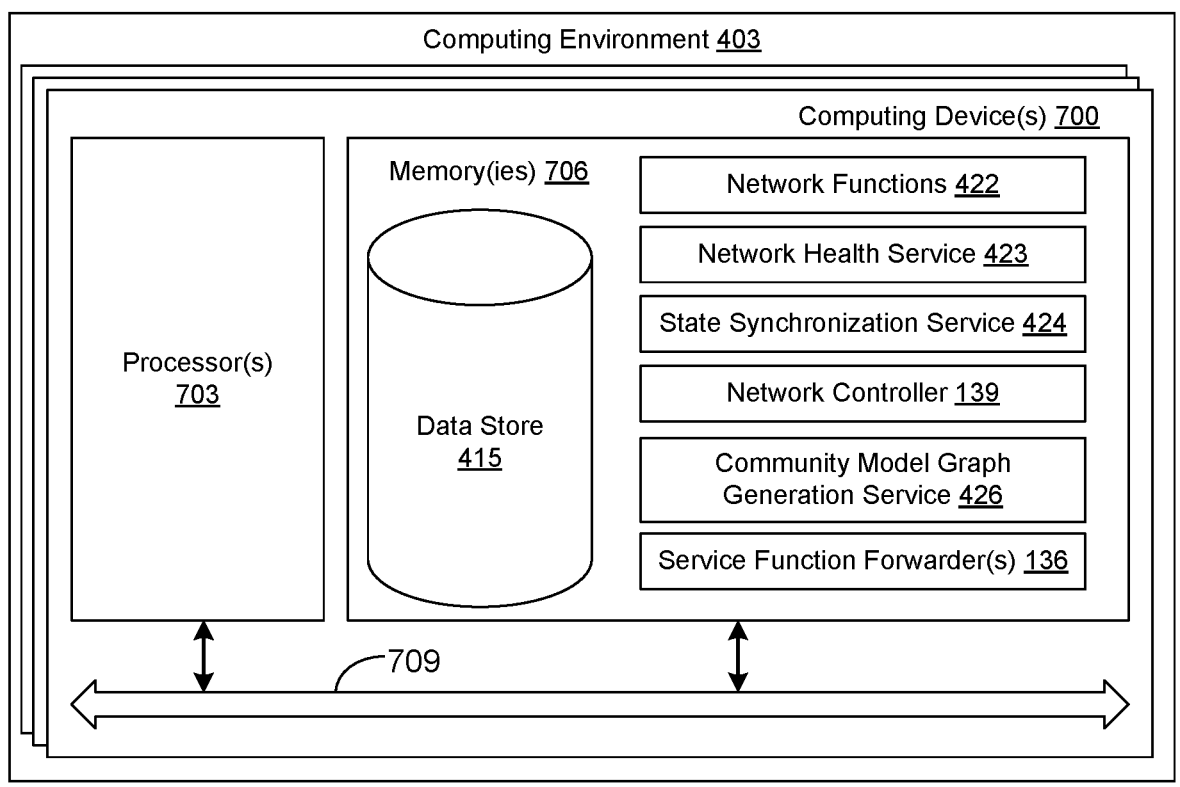
FIG. 7 is a schematic block diagram that provides one example illustration of a computing environment employed in the networked environment of FIG. 4 according to various embodiments of the present disclosure.

With reference to FIG. 7, shown is a schematic block diagram of the computing environment 403 according to an embodiment of the present disclosure. The computing environment 403 includes one or more computing devices 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the network functions 422, the network health service 423, the state synchronization service 424, the network controller 139, the community model graph generation service 426, the service function forwarders 136, and potentially other applications. Also stored in the memory 706 may be a data store 415 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the network functions 422, the network health service 423, the state synchronization service 424, the network controller 139, the community model graph generation service 426, the service function forwarders 136, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5-6B show the functionality and operation of an implementation of portions of the radio-based network 103. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 5-6B show a specific order of execution, it is understood that the order of execution may differ from that which is depicted. For example, the order of execution of two or more blocks may be scrambled relative to the order shown. Also, two or more blocks shown in succession in FIGS. 5-6B may be executed concurrently or with partial concurrence. Further, in some embodiments, one or more of the blocks shown in FIGS. 5-6B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network functions 422, the network health service 423, the state synchronization service 424, the network controller 139, the community model graph generation service 426, and the service function forwarders 136, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the network functions 422, the network health service 423, the state synchronization service 424, the network controller 139, the community model graph generation service 426, and the service function forwarders 136, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices 700 in the same computing environment 403.

Unless otherwise explicitly stated, articles such as "a" or "an", and the term "set", should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Embodiments of the present disclosure may be described by one or more of the following clauses:

Clause 1. A system, comprising: a radio-based network at least partly implemented in a cloud provider network; a software-defined network providing connectivity to a plurality of network functions in the radio-based network; a service function forwarder on the software-defined network configured to tunnel control plane traffic over the software-defined network from a first network function to a first instantiation of a second network function according to a service function chain; and a network controller configured to modify the service function chain to replace the first instantiation of the second network function with a second instantiation of the second network function, thereby causing the control plane traffic to be forwarded to the second instantiation of the second network function instead of the first instantiation of the second network function.

Clause 2. The system of clause 1, wherein the second network function corresponds to a distributed unit (DU) or a centralized unit (CU) of a radio access network.

Clause 3. The system of clauses 1 to 2, wherein the second network function corresponds to a core network function implemented in the cloud provider network.

Clause 4. The system of clauses 1 to 3, wherein the service function forwarder is configured to tunnel the control plane traffic by at least adding a network service header (NSH) to individual packets of the control plane traffic, and the second network function is NSH-aware.

Clause 5. The system of clauses 1 to 4, wherein the network controller is configured to modify the service function chain to replace the first instantiation of the second network function with the second instantiation of the second network function in response to detecting a service health event associated with the first instantiation of the second network function.

Clause 6. The system of clauses 1 to 5, wherein the network controller is further configured to transfer a state from the first instantiation of the second network function to the second instantiation of the second network function.

Clause 7. A computer-implemented method, comprising: forwarding, by a service function forwarder, network traffic from a source to a first instantiation of a network function in a radio-based network; determining to redirect the network traffic to a second instantiation of the network function instead of the first instantiation of the network function; reconfiguring the service function forwarder to forward the network traffic from the source to the second instantiation of the network function instead of the first instantiation of the network function; and forwarding, by the service function forwarder, the network traffic from the source to the second instantiation of the network function.

Clause 8. The computer-implemented method of clause 7, wherein determining to redirect the network traffic to the second instantiation of the network function instead of the first instantiation of the network function comprises determining that the first instantiation of the network function is unhealthy.

Clause 9. The computer-implemented method of clauses 7 to 8, wherein determining to redirect the network traffic to the second instantiation of the network function instead of the first instantiation of the network function comprises determining, by a load balancer, to load balance between the first instantiation of the network function and the second instantiation of the network function.

Clause 10. The computer-implemented method of clauses 7 to 9, further comprising forwarding, by another service function forwarder, the network traffic from the second instantiation of the network function to an instantiation of another network function.

Clause 11. The computer-implemented method of clauses 7 to 10, wherein the service function forwarder implements an overlay on top of a software-defined network, and the source comprises a radio unit.

Clause 12. The computer-implemented method of clauses 7 to 11, wherein the network function is implemented in a network component of a radio access network of the radio-based network, the network component corresponding to at least one of: a distributed unit (DU) or a centralized unit (CU).

Clause 13. The computer-implemented method of clauses 7 to 12, wherein the network function is a core network function implemented in a cloud provider network.

Clause 14. The computer-implemented method of clauses 7 to 13, wherein the network traffic corresponds to control plane traffic for the radio-based network.

Clause 15. The computer-implemented method of clauses 7 to 14, wherein forwarding the network traffic from the source to the second instantiation of the network function further comprises encapsulating, by a classifier, the network traffic by adding a network service header to individual packets in the network traffic.

Clause 16. The computer-implemented method of clauses 7 to 15, further comprising transferring state related to the network traffic from the first instantiation of the network function to the second instantiation of the network function.

Clause 17. The computer-implemented method of clauses 7 to 16, wherein the network function is network service header (NSH)-aware.

Clause 18. A computer-implemented method, comprising: receiving, by a network controller, adverse health information regarding a first instantiation of a network function in a radio-based network; and configuring, by the network controller, a service function forwarder to route network traffic to a second instantiation of the network function instead of the first instantiation of the network function in response to the adverse health information.

Clause 19. The computer-implemented method of clause 18, further comprising transferring state from the first instantiation of the network function to the second instantiation of the network function.

Clause 20. The computer-implemented method of clauses 18 to 19, wherein the network function is a radio access network function that is configured to decapsulate the network traffic.

Clause 21. A system, comprising: a radio-based network at least partly implemented in a cloud provider network; and at least one computing device in the cloud provider network configured to at least generate a community model graph representing the radio-based network, wherein individual nodes of the community model graph are assigned to logical communities encompassing one or more network functions of the radio-based network, individual edges of the community model graph correspond to a respective network connection between the one or more network functions of the radio-based network, and the individual edges are assigned a respective measure of relative importance; select a particular network connection between the one or more network functions having a highest measure of relative importance of the particular network connection; and initiate at least one of: a bandwidth upgrade for the particular network connection or a deployment of an additional network connection to supplement the particular network connection.

Clause 22. The system of clause 21, wherein the particular network connection connects a radio access network (RAN)-enabled edge server with the cloud provider network.

Clause 23. The system of clauses 21 to 22, wherein the community model graph is constructed using a Girvan-Newman algorithm.

Clause 24. The system of clauses 21 to 23, wherein the at least one computing device is further configured to at least modify a service function chain for a service function forwarder to route network traffic from a source to a first network function instead of a second network function associated with the particular network connection.

Clause 25. The system of clauses 21 to 24, wherein the at least one computing device is further configured to at least: detect an adverse health event impacting a plurality of network connections between network functions in the radio-based network; and prioritize self-healing activities for the plurality of network connections based at least in part on the respective measures of relative importance corresponding to individual ones of the plurality of network connections.

Clause 26. The system of clauses 21 to 25, wherein the respective measure of relative importance corresponds to an edge betweenness value.

Clause 27. A computer-implemented method, comprising: generating a community model graph representing a radio-based network, wherein individual nodes of the community model graph correspond to one or more network functions of the radio-based network, individual edges of the community model graph correspond to a respective network connection between the one or more network functions of the radio-based network, and the individual edges are assigned a respective measure of relative importance; selecting a particular network connection between the one or more network functions based at least in part on the respective measure of relative importance of the particular network connection; and implementing an action with respect to the particular network connection to increase resiliency of the radio-based network.

Clause 28. The computer-implemented method of clause 27, wherein the community model graph is generated based at least in part on a Girvan-Newman algorithm.

Clause 29. The computer-implemented method of clauses 27 to 28, wherein the respective measure of relative importance corresponds to an edge betweenness value.

Clause 30. The computer-implemented method of clauses 27 to 29, wherein the action comprises initiating a bandwidth upgrade for the particular network connection.

Clause 31. The computer-implemented method of clauses 27 to 30, wherein the action comprises initiating a deployment of an additional network connection to supplement the particular network connection.

Clause 32. The computer-implemented method of clauses 27 to 31, wherein the action comprises configuring a service function forwarder to route network traffic from a source to a different network function associated with a different network connection based at least in part on modifying a service function chain.

Clause 33. The computer-implemented method of clauses 27 to 32, wherein the particular network connection connects a radio access network (RAN)-enabled edge server with a cloud provider network.

Clause 34. The computer-implemented method of clauses 27 to 33, wherein the one or more network functions comprise one or more core network functions for the radio-based network.

Clause 35. A computer-implemented method, comprising: generating a community model graph representing a radio-based network, wherein individual nodes of the community model graph correspond to one or more network functions of the radio-based network, individual edges of the community model graph correspond to a respective network connection between the one or more network functions of the radio-based network, and the individual edges are assigned a respective measure of relative importance; detecting an adverse health event impacting a plurality of network connections between network functions in the radio-based network; and prioritizing self-healing activities for the plurality of network connections based at least in part on the respective measures of relative importance corresponding to individual ones of the plurality of network connections.

Clause 36. The computer-implemented method of clause 35, wherein the adverse health event comprises at least one of: a failure of networking hardware or a failure of a physical data link.

Clause 37. The computer-implemented method of clauses 35 to 36, wherein the adverse health event comprises an overutilization of a networking component shared at least in part by the plurality of network connections.

Clause 38. The computer-implemented method of clauses 35 to 37, wherein prioritizing the self-healing activities further comprises: determining that a first network connection of the plurality of network connections is associated with a higher measure of relative importance than a second network connection of the plurality of network connections; and initiating a first remedial action to address the adverse health event with respect to the first network connection before initiating a second remedial action to address the adverse health event with respect to the second network connection.

Clause 39. The computer-implemented method of clauses 35 to 38, further comprising: identifying a different network connection that is not impacted by the adverse health event based at least in part on the respective measure of relative importance of the different network connection; and wherein the self-healing activities comprise redirecting network traffic from a particular network function to the different network connection.

Clause 40. The computer-implemented method of clauses 35 to 39, wherein the self-healing activities further comprise configuring a service function forwarder to route network traffic from a source to a different network function based at least in part on modifying a service function chain.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   a radio-based network at least partly implemented in a cloud provider network; and
   at least one computing device in the cloud provider network configured to at least:
      generate a community model graph representing the radio-based network, wherein individual nodes of the community model graph are assigned to logical communities encompassing one or more network functions of the radio-based network, individual edges of the community model graph correspond to a respective network connection between the one or more network functions of the radio-based network, and the individual edges are assigned a respective measure of relative importance;
      select a particular network connection between the one or more network functions having a highest measure of relative importance of the particular network connection; and
      initiate at least one of: a bandwidth upgrade for the particular network connection or a deployment of an additional network connection to supplement the particular network connection.

2. The system of claim 1, wherein the particular network connection connects a radio access network (RAN)-enabled edge server with the cloud provider network.

3. The system of claim 1, wherein the community model graph is constructed using a Girvan-Newman algorithm.

4. The system of claim 1, wherein the at least one computing device is further configured to at least modify a service function chain for a service function forwarder to route network traffic from a source to a first network function instead of a second network function associated with the particular network connection.

5. The system of claim 1, wherein the at least one computing device is further configured to at least:
   detect an adverse health event impacting a plurality of network connections between network functions in the radio-based network; and
   prioritize self-healing activities for the plurality of network connections based at least in part on the respective measures of relative importance corresponding to individual ones of the plurality of network connections.

6. The system of claim 1, wherein the respective measure of relative importance corresponds to an edge betweenness value.

7. A computer-implemented method, comprising:
   generating a community model graph representing a radio-based network, wherein individual nodes of the community model graph correspond to one or more network functions of the radio-based network, individual edges of the community model graph correspond to a respective network connection between the one or more network functions of the radio-based network, and the individual edges are assigned a respective measure of relative importance;
   selecting a particular network connection between the one or more network functions based at least in part on the respective measure of relative importance of the particular network connection; and
   implementing an action with respect to the particular network connection to increase resiliency of the radio-based network.

8. The computer-implemented method of claim 7, wherein the community model graph is generated based at least in part on a Girvan-Newman algorithm.

9. The computer-implemented method of claim 7, wherein the respective measure of relative importance corresponds to an edge betweenness value.

10. The computer-implemented method of claim 7, wherein the action comprises initiating a bandwidth upgrade for the particular network connection.

11. The computer-implemented method of claim 7, wherein the action comprises initiating a deployment of an additional network connection to supplement the particular network connection.

12. The computer-implemented method of claim 7, wherein the action comprises configuring a service function forwarder to route network traffic from a source to a different network function associated with a different network connection based at least in part on modifying a service function chain.

13. The computer-implemented method of claim 7, wherein the particular network connection connects a radio access network (RAN)-enabled edge server with a cloud provider network.

14. The computer-implemented method of claim 7, wherein the one or more network functions comprise one or more core network functions for the radio-based network.

15. A computer-implemented method, comprising:
   generating a community model graph representing a radio-based network, wherein individual nodes of the community model graph correspond to one or more network functions of the radio-based network, individual edges of the community model graph correspond to a respective network connection between the one or more network functions of the radio-based network, and the individual edges are assigned a respective measure of relative importance;
   detecting an adverse health event impacting a plurality of network connections between network functions in the radio-based network; and
   prioritizing self-healing activities for the plurality of network connections based at least in part on the respective measures of relative importance corresponding to individual ones of the plurality of network connections.

16. The computer-implemented method of claim 15, wherein the adverse health event comprises at least one of: a failure of networking hardware or a failure of a physical data link.

17. The computer-implemented method of claim 15, wherein the adverse health event comprises an overutilization of a networking component shared at least in part by the plurality of network connections.

18. The computer-implemented method of claim 15, wherein prioritizing the self-healing activities further comprises:
   determining that a first network connection of the plurality of network connections is associated with a higher measure of relative importance than a second network connection of the plurality of network connections; and
   initiating a first remedial action to address the adverse health event with respect to the first network connection before initiating a second remedial action to address the adverse health event with respect to the second network connection.

19. The computer-implemented method of claim 15, further comprising:
   identifying a different network connection that is not impacted by the adverse health event based at least in part on the respective measure of relative importance of the different network connection; and
   wherein the self-healing activities comprise redirecting network traffic from a particular network function to the different network connection.

20. The computer-implemented method of claim 15, wherein the self-healing activities further comprise configuring a service function forwarder to route network traffic from a source to a different network function based at least in part on modifying a service function chain.

* * * * *